(12) United States Patent
Chang et al.

(10) Patent No.: US 7,489,369 B2
(45) Date of Patent: Feb. 10, 2009

(54) ARRAY SUBSTRATE FOR LIQUID CRYSTAL DISPLAY DEVICE AND METHOD OF MANUFACTURING THE SAME

(75) Inventors: Youn-Gyoung Chang, Uigwang-si (KR); Heung-Lyul Cho, Suwon-si (KR); Soon-Sung Yoo, Gunpo-si (KR)

(73) Assignee: LG Display Co. Ltd., Seoul (KR)

( * ) Notice: Subject to any disclaimer, the term of this patent is extended or adjusted under 35 U.S.C. 154(b) by 444 days.

(21) Appl. No.: 11/325,570

(22) Filed: Jan. 5, 2006

(65) Prior Publication Data
US 2006/0119779 A1 Jun. 8, 2006

Related U.S. Application Data

(62) Division of application No. 10/704,668, filed on Nov. 12, 2003, now Pat. No. 7,016,007.

(30) Foreign Application Priority Data
Nov. 11, 2002 (KR) .................. 10-2002-0069578
Sep. 19, 2003 (KR) .................. 10-2003-0065240

(51) Int. Cl.
*G02F 1/136* (2006.01)
*G02F 1/1343* (2006.01)
(52) U.S. Cl. .................. 349/43; 349/52; 349/141; 257/72; 430/180
(58) Field of Classification Search .................. 349/43, 349/52, 141; 257/72; 430/180
See application file for complete search history.

(56) References Cited
U.S. PATENT DOCUMENTS
4,467,345 A * 8/1984 Ozawa .................. 257/786

4,772,377 A * 9/1988 Geist et al. .................. 204/415
5,356,823 A * 10/1994 Mitani .................. 438/180

(Continued)

FOREIGN PATENT DOCUMENTS
DE 19721451 5/1997

(Continued)

OTHER PUBLICATIONS
Communication from German Patent and Trademark Office.

*Primary Examiner*—Julie Ngo
(74) *Attorney, Agent, or Firm*—McKenna Long & Aldridge LLP

(57) ABSTRACT

A method of manufacturing an array substrate for a liquid crystal display device includes forming a gate line, a gate pad and a gate electrode on a substrate through a first mask process, forming a data line, a data pad, a source electrode, a drain electrode and an active layer on the substrate including the gate line, the gate pad and the gate electrode through a second mask process, wherein the data line crosses the gate line to define a pixel region, the source electrode is extended from the data line, the drain electrode is spaced apart from the source electrode, and the active layer is disposed between the gate electrode and the source and drain electrodes, forming a passivation layer on an entire surface of the substrate including the data line, the source electrode and the drain electrode through a third mask process, the passivation layer being etched to expose the substrate in the pixel region, a part of the drain electrode, the gate pad and the data pad, and forming a pixel electrode, a gate pad terminal and a data pad terminal by depositing a transparent conductive material on an entire surface of the substrate including the passivation layer, the pixel electrode directly contacting the exposed part of the drain electrode, the gate pad terminal directly contacting the gate pad, and the data pad terminal directly contacting the data pad.

12 Claims, 39 Drawing Sheets

U.S. PATENT DOCUMENTS

| | | | |
|---|---|---|---|
| 5,660,971 A * | 8/1997 | Kobayashi et al. | 430/315 |
| 6,600,546 B1 * | 7/2003 | Ahn et al. | 349/187 |
| 2002/0021403 A1 * | 2/2002 | Kim et al. | 349/187 |
| 2002/0044228 A1 * | 4/2002 | Oh et al. | 349/40 |
| 2002/0052058 A1 * | 5/2002 | Tseng | 438/30 |
| 2002/0054247 A1 | 5/2002 | Hwang et al. | |
| 2003/0197187 A1 * | 10/2003 | Kim et al. | 257/83 |

FOREIGN PATENT DOCUMENTS

| | | |
|---|---|---|
| DE | 19906815 | 2/1999 |
| EP | 0 694 804 | 1/1996 |
| JP | 5-127193 | 5/1993 |
| JP | 5-265041 | 10/1993 |
| JP | 6-102528 | 4/1994 |
| JP | 7-65326 | 3/1995 |
| JP | 10-68971 | 3/1998 |
| JP | 2002-98995 | 4/2002 |
| TW | 413949 | 12/2000 |
| TW | 486825 | 5/2002 |

\* cited by examiner

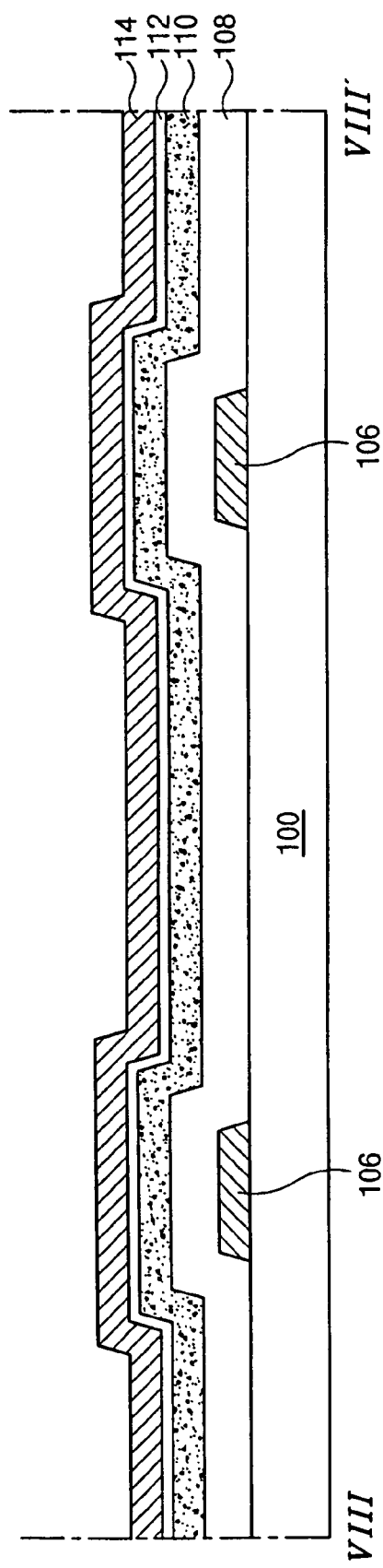
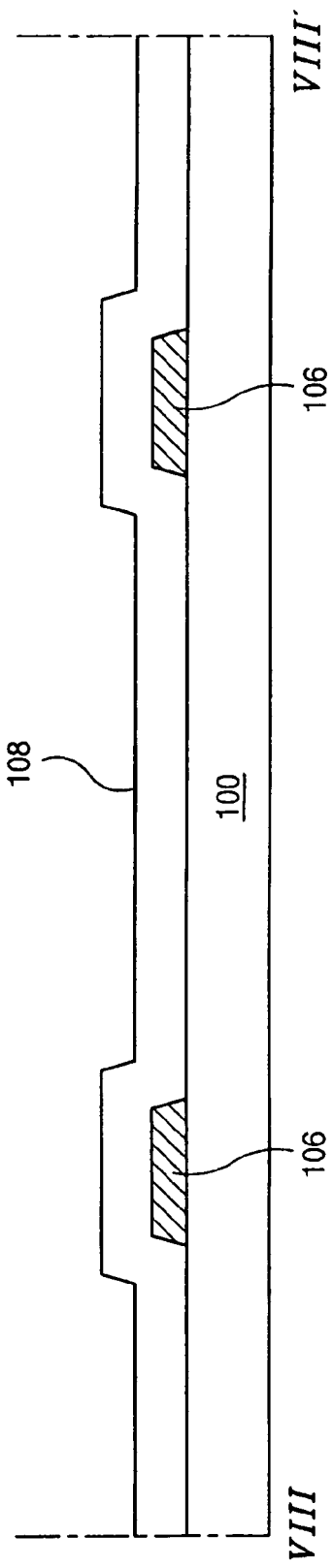
FIG. 8C
FIG. 8D

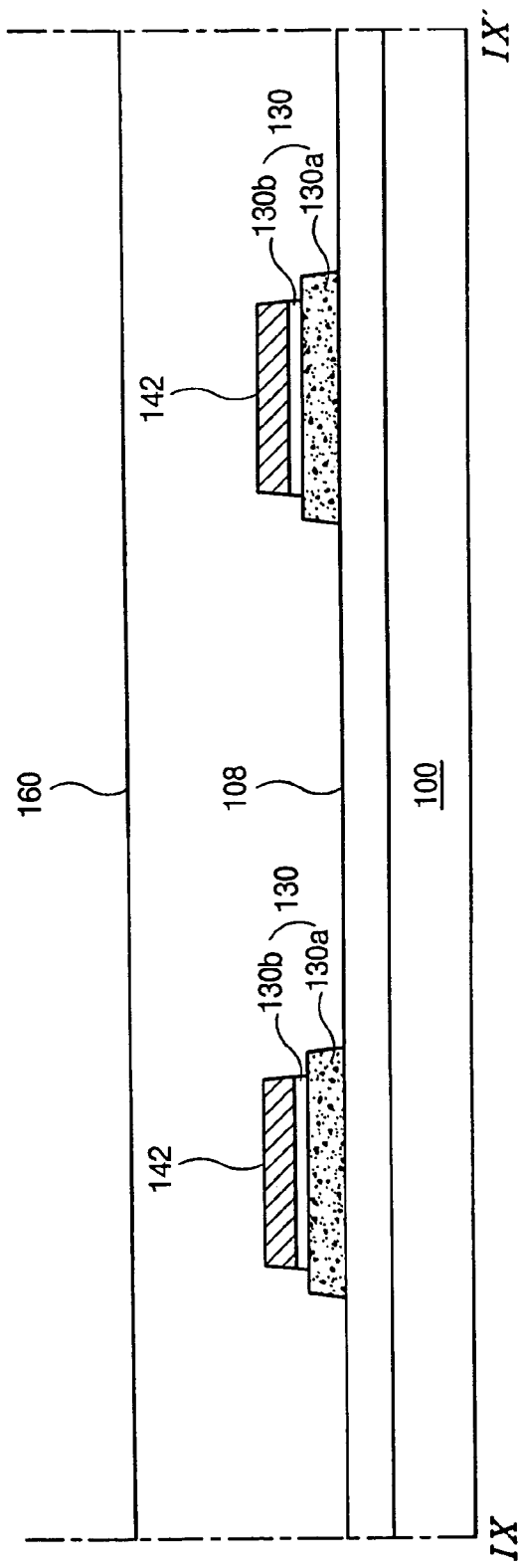
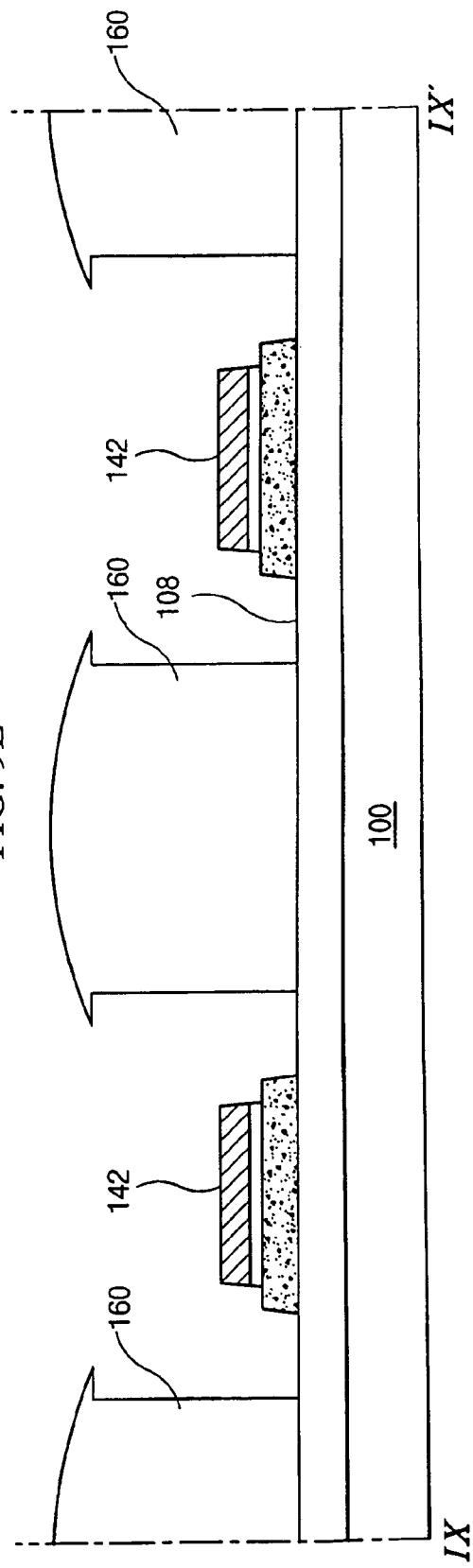
FIG. 9E
FIG. 9F

ARRAY SUBSTRATE FOR LIQUID CRYSTAL DISPLAY DEVICE AND METHOD OF MANUFACTURING THE SAME

CROSS-REFERENCE TO RELATED APPLICATIONS

This application is a Divisional of application Ser. No. 10/704,668, filed Nov. 12, 2003, now U.S. Pat. No. 7,016,007 now allowed; which claims priority to Korean Patent Application Nos. 10-2003-0065240 and 10-2002-0069578, filed Nov. 11, 2002 and Sep. 19, 2003 respectively, all of which are hereby incorporated by reference as if fully set forth herein.

This application claims the benefit of the Korean Patent Application Nos. 2002-069578 filed on Nov. 11, 2002, and 2003-065240 filed on Sep. 19, 2003, which are hereby incorporated by reference for all purposes as if fully set forth herein.

BACKGROUND OF THE INVENTION

1. Field of the Invention

The present invention relates to a liquid crystal display (LCD) device and more particularly, to an array substrate for the liquid crystal display device and a method of manufacturing the same.

2. Discussion of the Related Art

In general, a liquid crystal display (LCD) device includes two substrates, which are spaced apart and facing each other, and a liquid crystal layer interposed between the two substrates. Each of the substrates includes an electrode, and the electrodes of each substrate are also facing each other. Voltage is applied to each electrode, and thus an electric field is induced between the electrodes. Alignment of the liquid crystal molecules is changed by the varying intensity or direction of the electric field. The LCD device displays a picture by varying transmissivity of the light according to the arrangement of the liquid crystal molecules.

A related art LCD device will be described hereinafter in detail with reference to figures.

FIG. 1 is an exploded perspective view illustrating a related art LCD device 11. The related art LCD device 1 has upper and lower substrates 5 and 22, which are spaced apart from and facing each other, and also has liquid crystal 15 interposed between the upper substrate 5 and the lower substrate 22.

The upper substrate 5 includes a black matrix 6, a color filter layer 7, and a common electrode 9 subsequently on the inside (i.e., the side facing the lower substrate 22). The black matrix 6 has openings. The color filter layer 7 corresponds to the openings in the black matrix 6 and includes three sub-color filters of red (R), green (G), and blue (B). The common electrode 9 is formed on the color filter 7 and is transparent.

At least one gate line 12 and at least one data line 34 are formed on the inner surface of the lower substrate 22 (i.e., the side facing the upper substrate 5). The gate line 12 and the date line 34 cross each other to define a pixel region P. A thin film transistor T, as a switching element, is formed at the crossing of the gate line 12 and the data line 34. The thin film transistor T includes a gate electrode, a source electrode and a drain electrode. A plurality of such thin film transistors is arranged in a matrix form to correspond to other crossings of gate and data lines. A pixel electrode 56, which is connected to the thin film transistor T, is formed in the pixel region P. The pixel electrode 56 corresponds to the sub-color filter, and is made of a transparent conductive material such as indium-tin-oxide (ITO) that transmits light relatively well. The lower substrate 22, which includes the thin film transistors T and the pixel electrodes 56 arranged in the matrix form, may be commonly referred to as an array substrate.

In operation, a scanning pulse is applied to the gate electrode of the thin film transistor T through the gate line 12 and a data signal is applied to the source electrode of the thin film transistor T through the data line 34.

The LCD device 11 is driven due to electrical and optical effects of the liquid crystal 15. The liquid crystal 15 is dielectric anisotropic material having a property of spontaneous polarization. When a voltage is applied, the liquid crystal 15 forms a dipole by the spontaneous polarization, and thus molecules of the liquid crystal are arranged by an electric field. Optical modulation occurs from the optical properties of the liquid crystal, which vary according to the arrangement of the liquid crystal. Images of the LCD device are produced by controlling transmittance of the light due to the optical modulation.

Since the LCD device is fabricated through complicated processes, there have been trials for reducing fabricating time and costs by simplifying the processes.

As one method for this, the array substrate for the LCD device has been manufactured through processes using four masks, which may be referred to as four-mask processes, from processes using five to seven masks.

FIG. 2 illustrates a plan view of an array substrate for a LCD device fabricated through four-mask processes according to the related art. In FIG. 2, a gate line 12 and a data line 34 cross each other and define a pixel region P. A thin film transistor T is formed as a switching element at the crossing of the gate and data lines 12 and 34. A gate pad 10 is formed at one end of the gate line 12, and a data pad 36 is formed at one end of the data line 34. A gate pad terminal 58 and a data pad terminal 60, which have an island shape and are made of a transparent conducting material, overlap the gate pad 10 and the data pad 36, respectively.

The thin film transistor T includes a gate electrode 14 that is connected to the gate line 12 and receives scanning signals, a source electrode 40 that is connected to the data line 34 and receives data signals, and a drain electrode 42 that is spaced apart from the source electrode 40. The thin film transistor T further includes an active layer 32 between the gate electrode 14 and the source and drain electrodes 40 and 42. A metal pattern 38 of an island shape overlaps the gate line 12.

A pixel electrode 56 is formed in the pixel region P and is connected to the drain electrode 42. The pixel electrode 56 is extended over the gate line 12, and thus is also connected to the metal pattern 38. The gate line 12 and the metal pattern 38 function as first and second storage capacitor electrodes, respectively, and form a storage capacitor Cst with a gate insulating layer (not shown) disposed between the gate line 12 and the metal pattern 38.

Although not shown in the figure, an ohmic contact layer is formed between the active layer 32 and the source and drain electrodes 40 and 42. The active layer 32 is made of amorphous silicon, and the ohmic contact layer is formed of doped amorphous silicon. A first pattern 35 and a second pattern 29, which include the amorphous silicon and the doped amorphous silicon, are formed under the data line 34 and the metal pattern 38, respectively.

As stated above, the array substrate of FIG. 2 is fabricated using four masks, and manufacturing processes of the array substrate will be described hereinafter with reference to attached drawings.

FIGS. 3A to 3G, FIGS. 4A to 4G, and FIGS. 5A to 5G are cross-sectional views taken along III-III', IV-IV' and V-V', respectively, in FIG. 2 illustrating a method of manufacturing an array substrate according to the related art.

As illustrated in FIGS. 3A, 4A and 5A, a gate line 12, a gate electrode 14 and a gate pad 10 are formed on a transparent insulating substrate 22 by depositing a first metal layer and patterning the first metal layer through a first photolithography process using a first mask, i.e., a first mask process. The gate line 12, the gate electrode 14 and the gate pad 10 are made of a metal material such as aluminum (Al), an aluminum alloy, molybdenum (Mo), tungsten (W), and chromium (Cr). The gate line 12, the gate electrode 14 and the gate pad 10 made of aluminum or aluminum alloy may be formed of a double layer including molybdenum or chromium.

Next, a gate insulating layer 16, an amorphous silicon layer 18, a doped amorphous silicon layer 20 and a second metal layer 24 are subsequently deposited on the substrate 22 including the gate line 12, the gate electrode 14 and the gate pad 10 thereon. The gate insulating layer 16 acts as a first insulating layer and is made of an inorganic insulating material such as silicon nitride (SiNx) and silicon oxide (SiO$_2$). The second metal material 24 is formed of one of chromium, molybdenum, tungsten and tantalum (Ta).

As illustrated in FIGS. 3B, 4B and 5B, a photoresist layer 26 is formed on the second metal layer 24 by coating photoresist. The photoresist layer 26 may be a positive type, and a portion exposed to light is developed and removed. Subsequently, the photoresist layer 26 is exposed to light. A second mask 70, which has a transmitting portion A, a blocking portion B and a half transmitting portion C (which may be referred to as a slit portion), is disposed over the photoresist layer 26 spacing apart. The half transmitting portion C corresponds to the gate electrode 14. The photoresist layer 26 corresponding to the half transmitting portion C is exposed less than the photoresist layer 26 corresponding to the transmitting portion A.

As illustrated in FIGS. 3C, 4C and 5C, the exposed photoresist layer 26 of FIGS. 3B, 4B and 5B is developed, and a photoresist pattern 26a is formed. Because of the different transmittances of the portions of the second mask 70, the photoresist pattern 26a has different thicknesses. A first thickness of the photoresist pattern 26a corresponds to the blocking portion B of FIGS. 3B, 4B and 5B and a second thickness of the photoresist pattern 26a, which is thinner than the first thickness, corresponds to the half transmitting portion C of FIGS. 3B, 4B and 5B.

As illustrated in FIGS. 3D, 4D and 5D, the second metal layer 24, the doped amorphous silicon layer 20 and the amorphous silicon layer 18 of FIGS. 3C, 4C and 5C exposed by the photoresist pattern 26a are removed. Thus a source and drain pattern 28, a data line 34 of FIG. 2, a data pad 36, a doped amorphous silicon pattern 32a, and an active layer 30 are formed. The second metal layer 24 of FIGS. 3C, 4C and 5C is etched by a wet etching method, and the doped amorphous silicon layer 20 and the amorphous silicon layer 18 of FIGS. 3C, 4C and 5C are patterned by a dry etching method. The source and drain pattern 28 is formed over the gate electrode 14, and is connected to the data line 34 of FIG. 2, which extends vertically in the context of the figure. The doped amorphous silicon pattern 32a and the active layer 30 have the same shape as the source and drain pattern 28 and the data line 34.

At this time, a metal pattern 38 of an island shape is also formed over the gate line 12. A first pattern 35 and a second pattern 29, which include the amorphous silicon layer and the doped amorphous silicon layer, are formed. The first pattern 35 is located under the data line 34 and the data pad 36 and the second pattern 29 is situated under the metal pattern 38.

Next, as illustrated in FIGS. 3E, 4E and 5E, the second thickness of the photoresist pattern 26a is removed through an ashing process, and thus the source and drain pattern 28 is exposed. Here, the photoresist pattern 26a of the first thickness is also removed partially and the first thickness of the photoresist pattern 26a is thinned. Additionally, edges of the photoresist pattern 26a are removed, and the metal patterns 28, 36 and 38 are exposed.

As illustrated in FIGS. 3F, 4F and 5F, the source and drain pattern 28 and the doped amorphous silicon pattern 32a of FIG. 3E, which are exposed by the photoresist pattern 26a of FIG. 3E, are etched. Thus, source and drain electrodes 40 and 42 and an ohmic contact layer 32 are formed, and the active layer 30 is exposed. The exposed active layer 30 between the source and drain electrodes 40 and 42 becomes a channel CH of a thin film transistor. The source and drain electrodes 40 and 42 are spaced apart from each other. A region between the source and drain electrodes 40 and 42 corresponds to the half transmitting portion C of the second mask 70 of FIG. 3B.

If the source and drain pattern 28 of FIG. 3E is formed of molybdenum (Mo), the source and drain pattern 28 and the doped amorphous silicon pattern 30a of FIG. 3E can be removed using the dry etching method at one time. However, if the source and drain pattern 28 is formed of chromium (Cr), the source and drain pattern 28 is etched by the wet etching method, and then the doped amorphous silicon pattern 32a is removed by the dry etching method.

As stated above, the source and drain electrodes 40 and 42, the data line 34, the data pad 36, the metal pattern 38, the ohmic contact layer 32 and the active layer 30 are formed through a second photolithography process using the second mask 70 of FIGS. 3B, 4B and 5B.

Next, the photoresist pattern 26a is removed, and a passivation layer 46 is formed as a second insulating layer on the data line 34, the source and drain electrodes 40 and 42, the data pad 36, and the metal pattern 38 by coating a transparent organic material such as benzocyclobutene (BCB) and acrylic resin or depositing an inorganic material such as silicon nitride (SiNx) and silicon oxide (SiO$_2$). The passivation layer 46 is patterned with the gate insulating layer 16 through a third photolithography process using a third mask, and a drain contact hole 48, a storage contact hole 50, a gate pad contact hole 52 and a data pad contact hole 54 are formed. The drain contact hole 48, the storage contact hole 50, the gate pad contact hole 52 and the data pad contact hole 54 expose the drain electrode 42, the metal pattern 38, the gate pad 10 and the data pad 36, respectively.

As illustrated in FIGS. 3G, 4G and 5G, a pixel electrode 56, a gate pad terminal 58 and a data pad terminal 60 are formed on the passivation layer 46 by depositing a transparent conductive material such as indium-tin-oxide (ITO) and indium-zinc-oxide (IZO) and patterning the transparent conductive material through a fourth photolithography process using a fourth mask. The pixel electrode 56 is connected to not only the drain electrode 42 via the drain contact hole 48 but also to the metal pattern 38 through the storage contact hole 50. The gate pad terminal 58 is connected to the gate pad 10 via the gate pad contact hole 52 and the data pad terminal 60 is connected to the data pad 36 through the data pad contact hole 54.

As mentioned above, the array substrate is manufactured through photolithography processes using a mask, i.e., a mask process. The photolithography process includes several steps of cleaning, coating a photo-resist layer, exposing through a mask, developing the photo-resist layer, and etching. Therefore, fabricating time, costs, and failure may be decreased by reducing the number of the photolithography processes.

SUMMARY OF THE INVENTION

Accordingly, the present invention is directed to an array substrate for a liquid crystal display device and a method of manufacturing the same that substantially obviates one or more problems due to limitations and disadvantages of the related art.

An advantage of the present invention is to provide an array substrate for a liquid crystal display device and a method of manufacturing the same that increases productivity because of shorter processes and lower cost.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes a gate line and a gate pad on a substrate, a data line and a data pad on the substrate, the data line crossing the gate line to define a pixel region, a thin film transistor at a crossing of the gate and data lines and including a gate electrode, an active layer, a source electrode and a drain electrode, a passivation layer provided on an entire surface of the substrate including the thin film transistor, wherein the passivation layer is etched to expose the substrate in the pixel region, a part of the drain electrode, the gate pad, and the data pad, and a pixel electrode, a gate pad terminal and a data pad terminal on the substrate including the passivation layer, the pixel electrode directly contacting the exposed part of the drain electrode, the gate pad terminal contacting the exposed gate pad, and the data pad terminal contacting the data pad.

In another aspect of the present invention, a method of manufacturing an array substrate for a liquid crystal display device includes forming a gate line, a gate pad and a gate electrode on a substrate through a first mask process, forming a data line, a data pad, a source electrode, a drain electrode and an active layer on the substrate including the gate line, the gate pad and the gate electrode through a second mask process, wherein the data line crosses the gate line to define a pixel region, the source electrode is extended from the data line, the drain electrode is spaced apart from the source electrode, and the active layer is disposed between the gate electrode and the source and drain electrodes, forming a passivation layer over an entire surface of the substrate including the data line, the source electrode and the drain electrode through a third mask process, the passivation layer being etched to expose the substrate in the pixel region, a part of the drain electro e, the gate pad and the data pad, and forming a pixel electrode, a gate pad terminal and a data pad terminal by depositing a transparent conductive material on an entire surface of the substrate including the passivation layer, the pixel electrode directly contacting the exposed part of the drain electrode, the gate pad terminal directly contacting the gate pad, and the data pad terminal directly contacting the data pad.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 7A to 7H, FIGS. 8A to 8H, and FIGS. 9A to 9H are cross-sectional views of FIG. 6 illustrating a method of manufacturing an array substrate according to the embodiment of the present invention.

DETAILED DESCRIPTION OF THE ILLUSTRATED EMBODIMENTS

Reference will now be made in detail to embodiments of the present invention, which are illustrated in the accompanying drawings.

Figure 1:
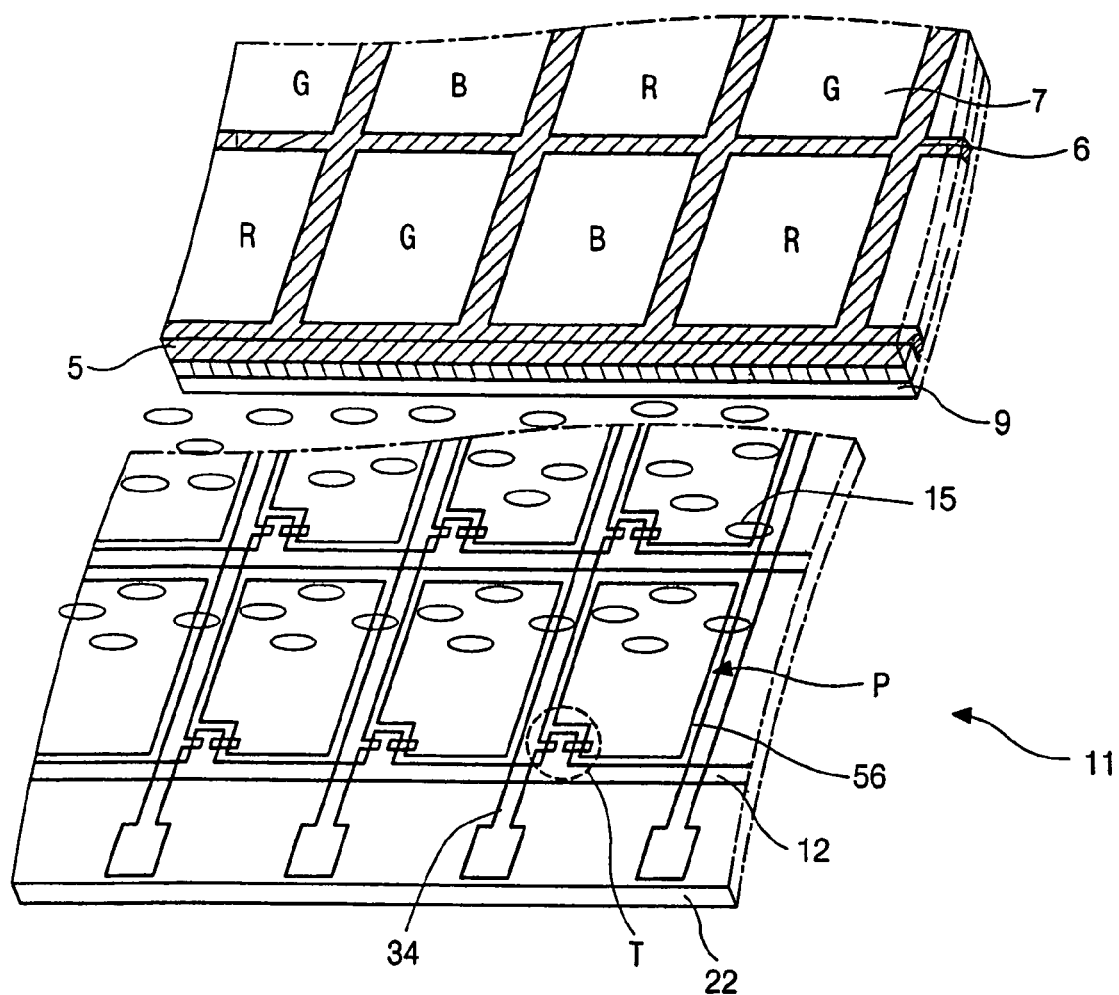
FIG. 1 is an exploded perspective view illustrating a related art liquid crystal display device (LCD) device.
Figure 2:
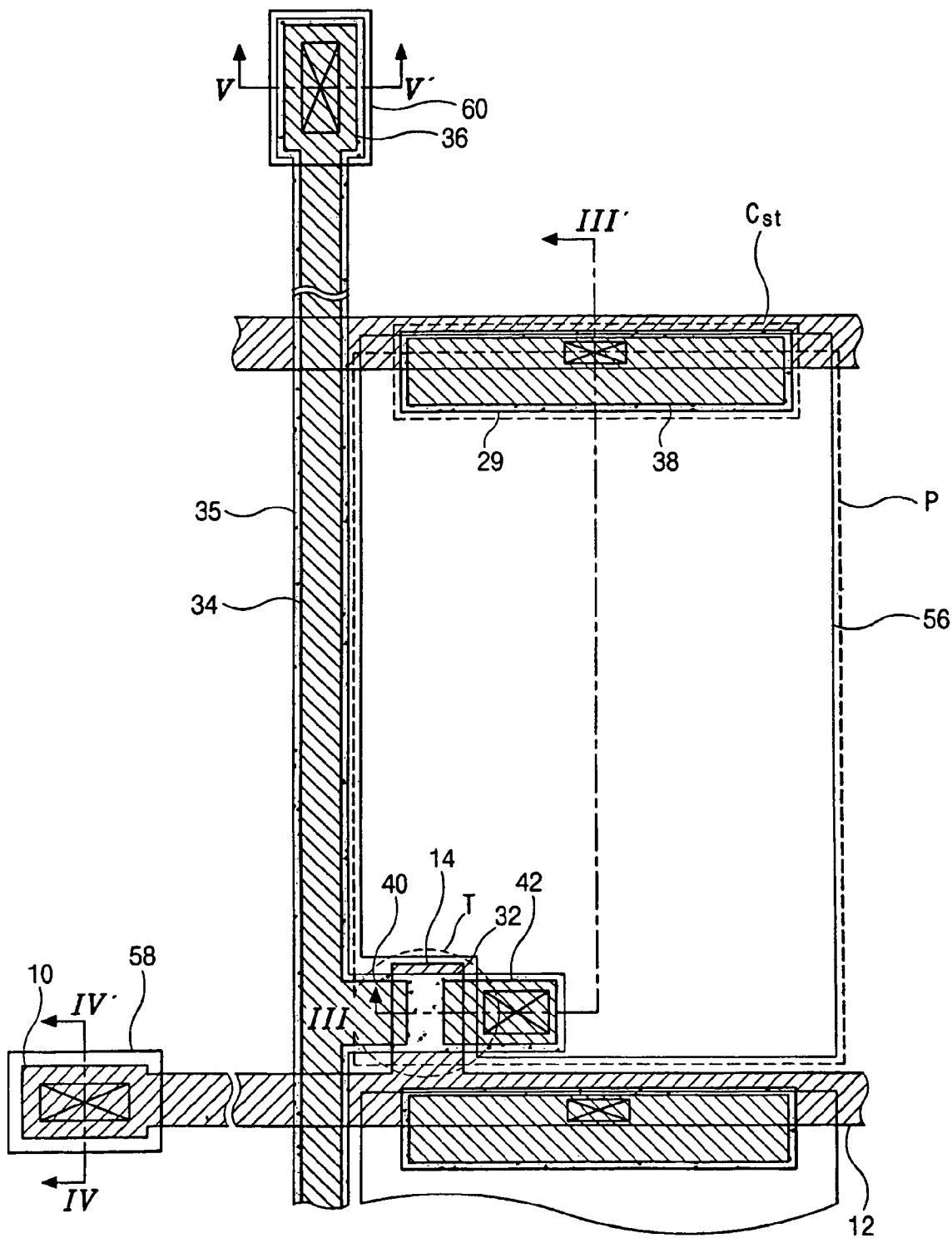
FIG. 2 is a plan view of an array substrate for a LCD device according to the related art.
Figure 3A:
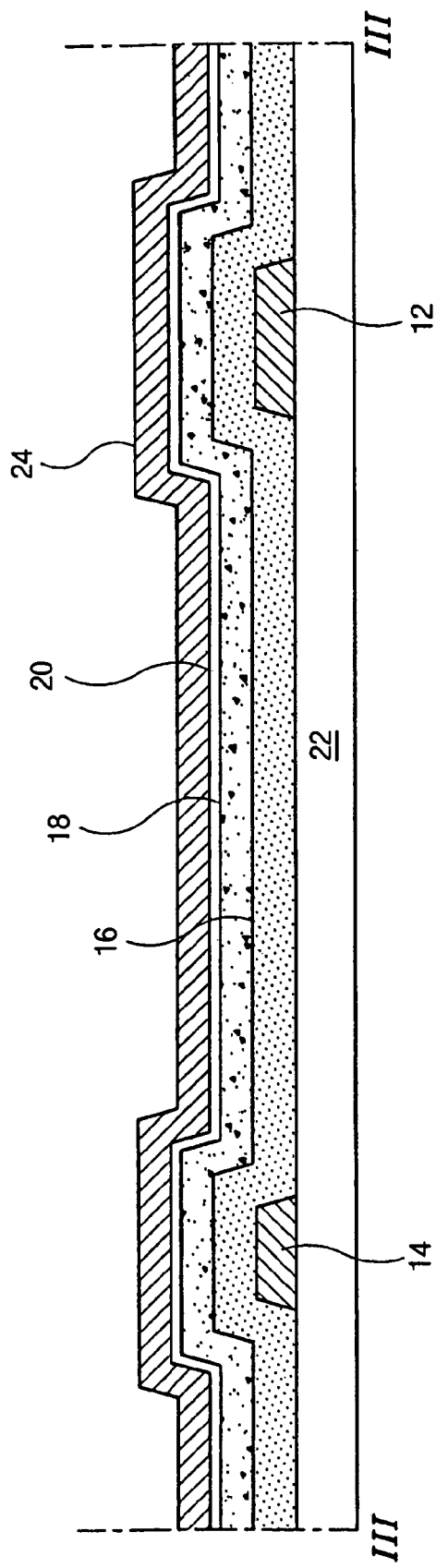
FIGS. 3A to 3G, FIGS. 4A to 4G, and FIGS. 5A to 5G are cross-sectional views illustrating a method of manufacturing an array substrate according to the related art.
Figure 3B:
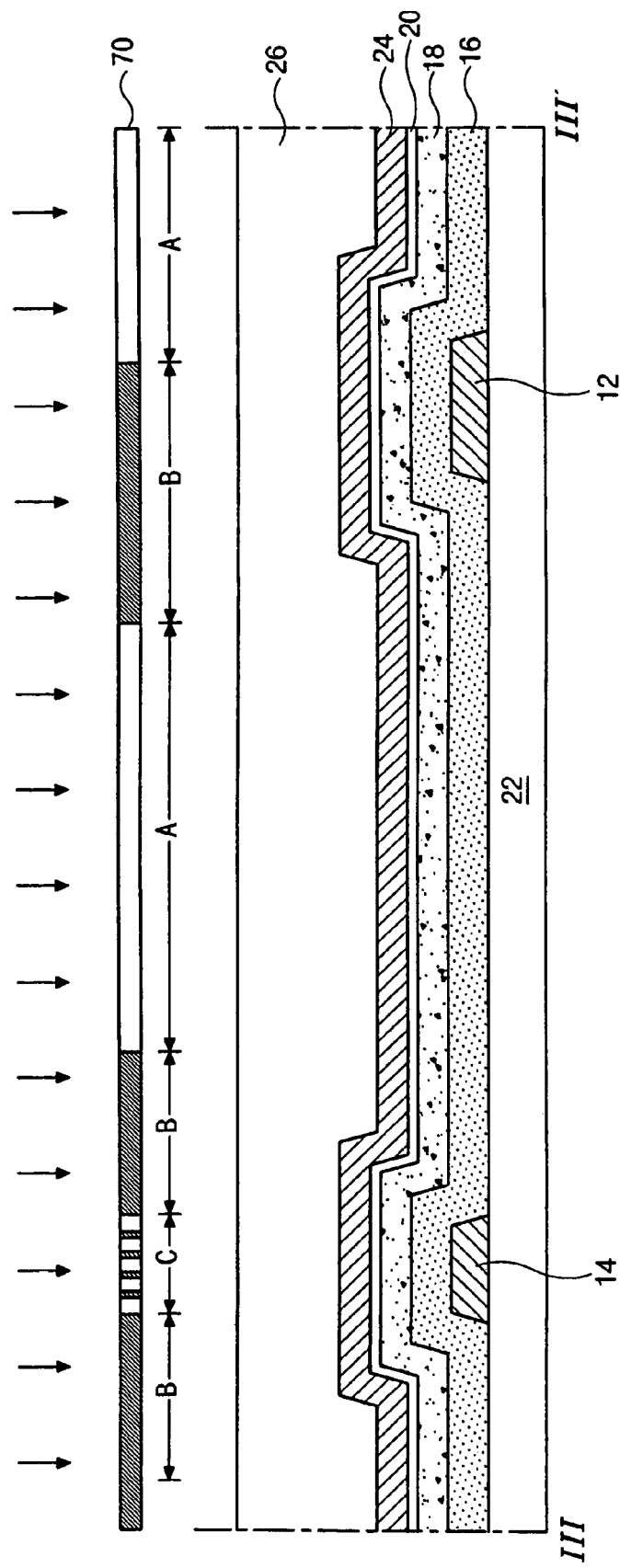
Figure 3C:
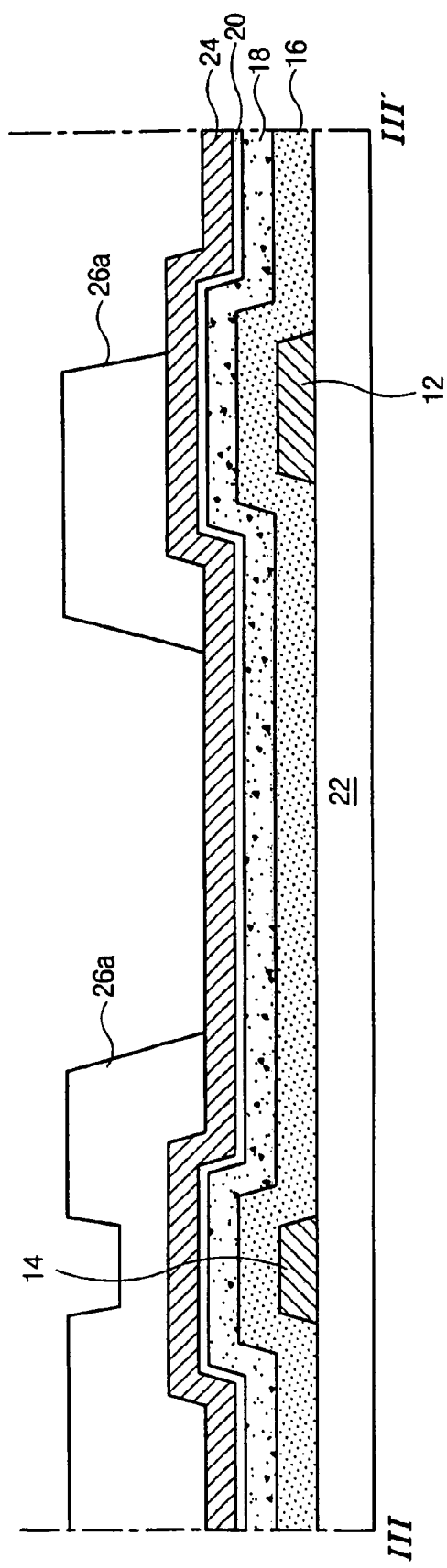
Figure 3D:
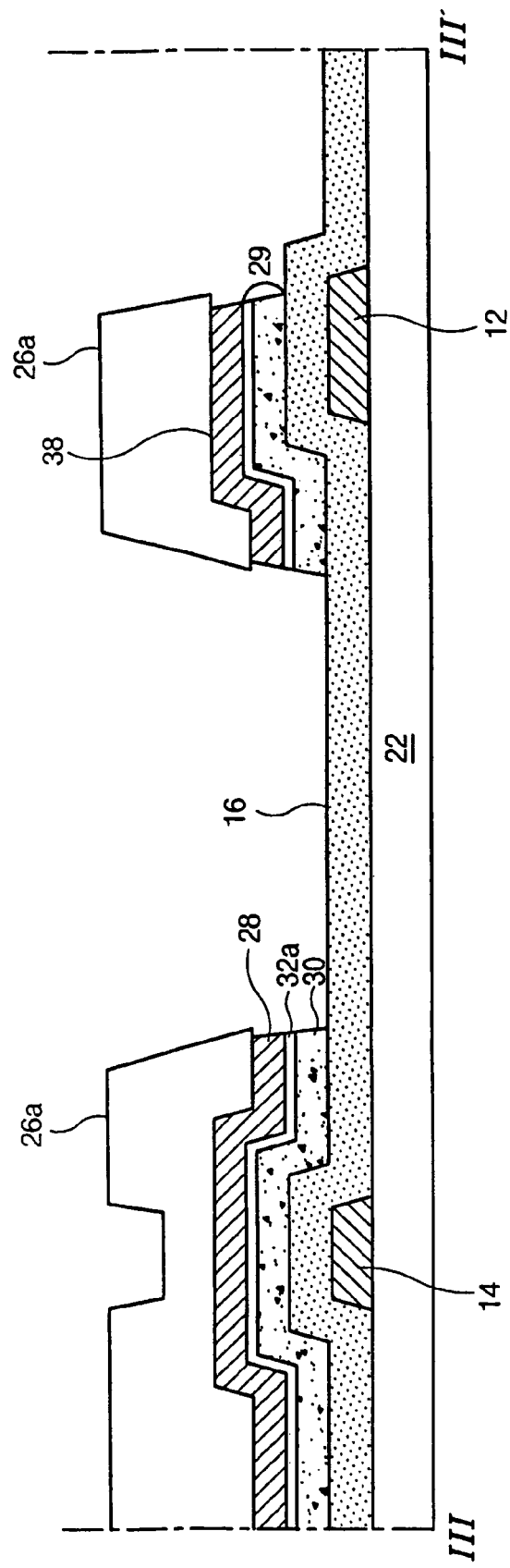
Figure 3E:
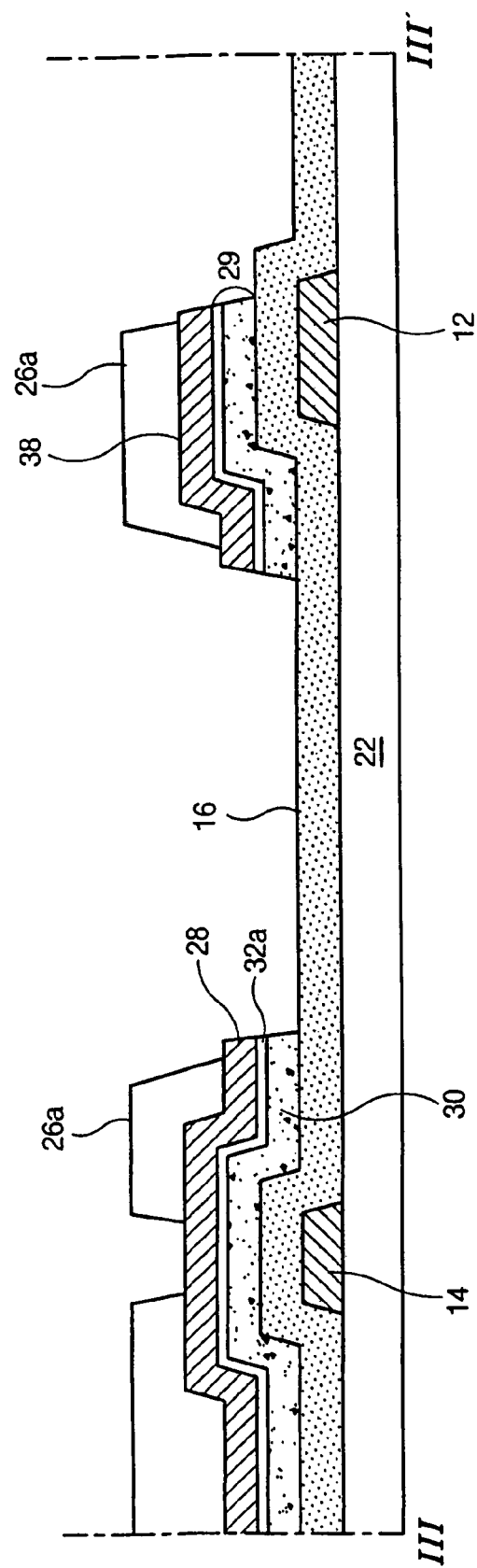
Figure 3F:
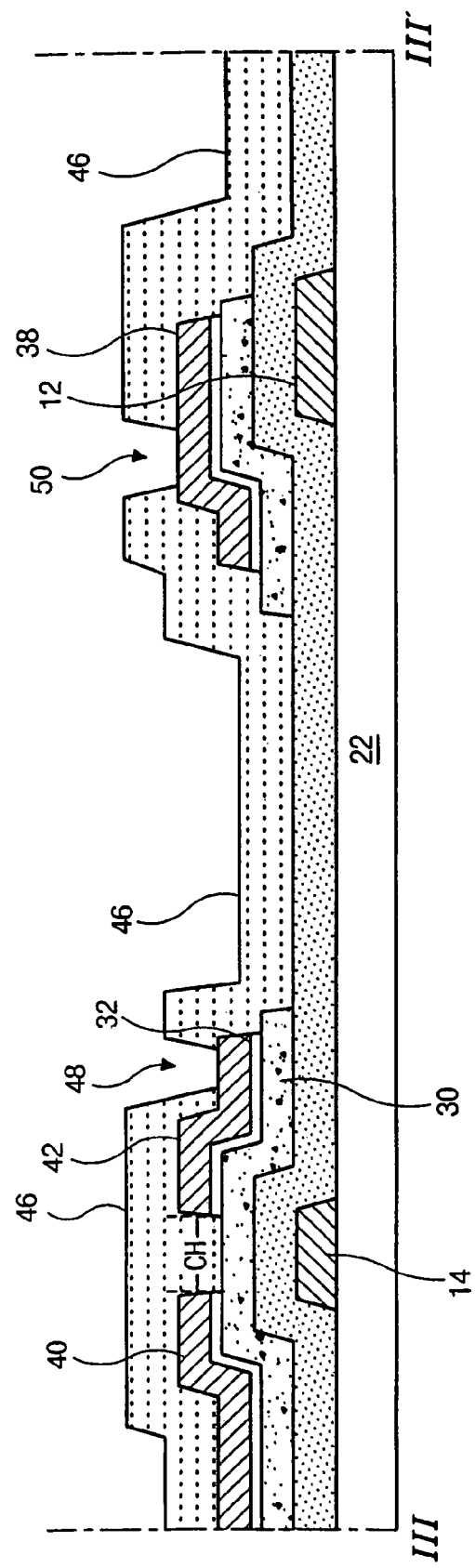
Figure 3G:
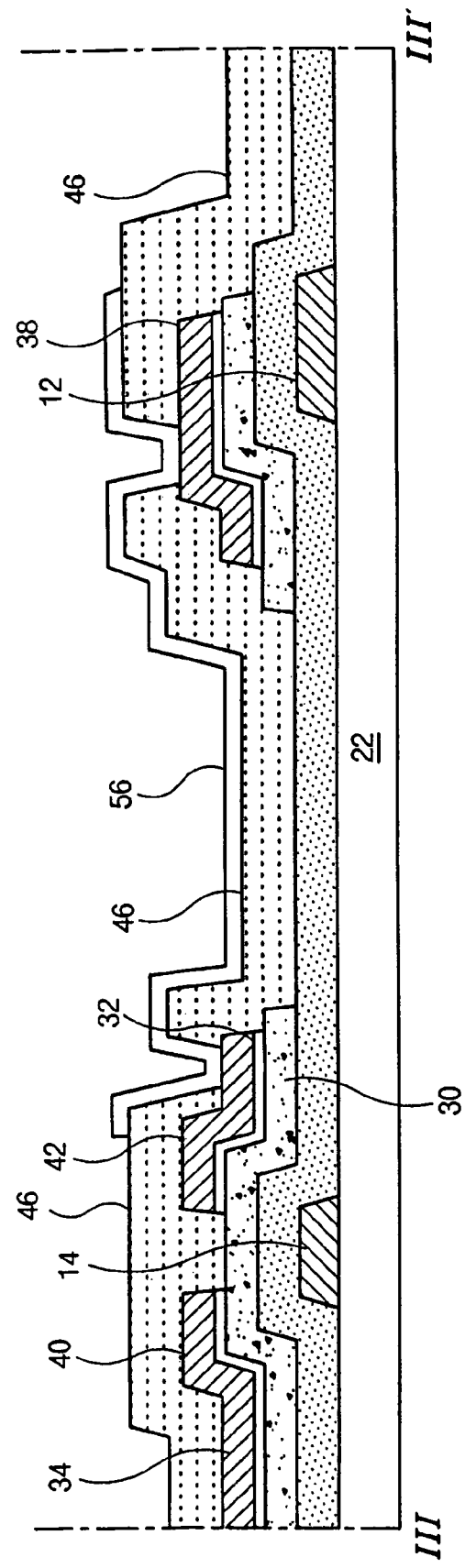
Figure 4A:
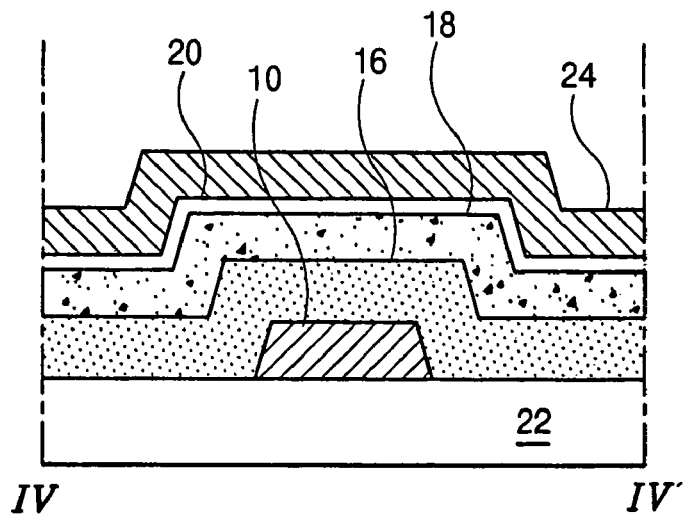
Figure 4B:
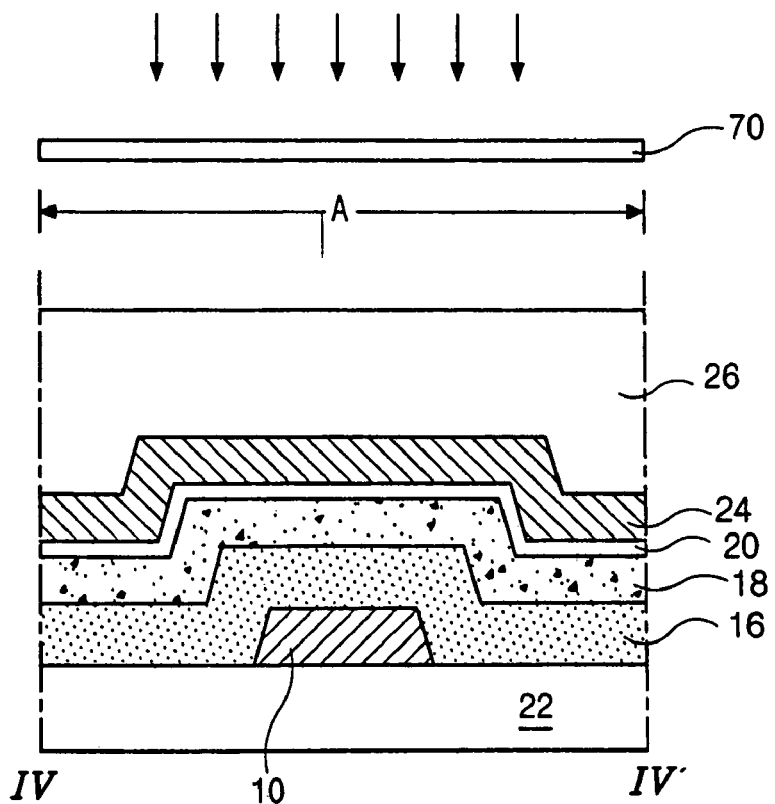
Figure 4C:
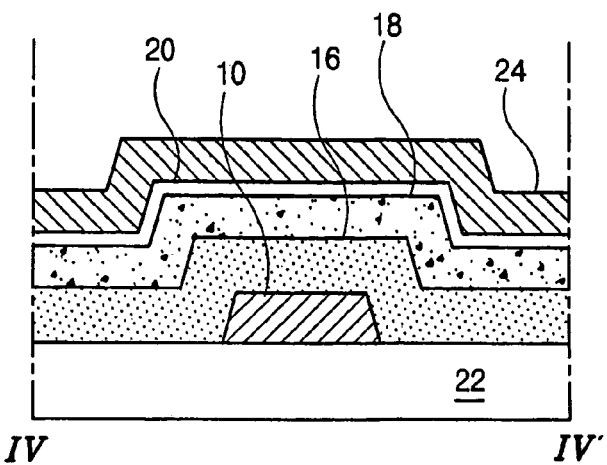
Figure 4D:
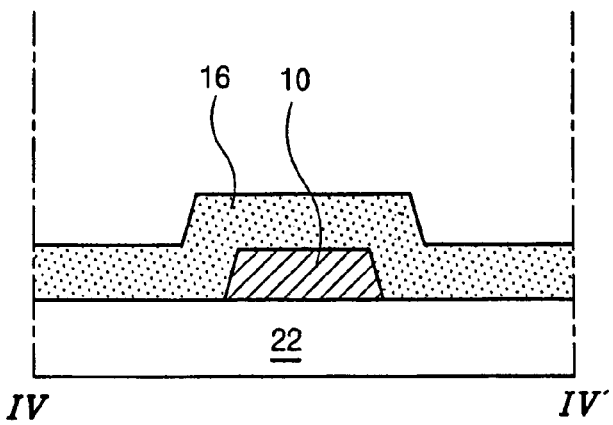
Figure 4E:
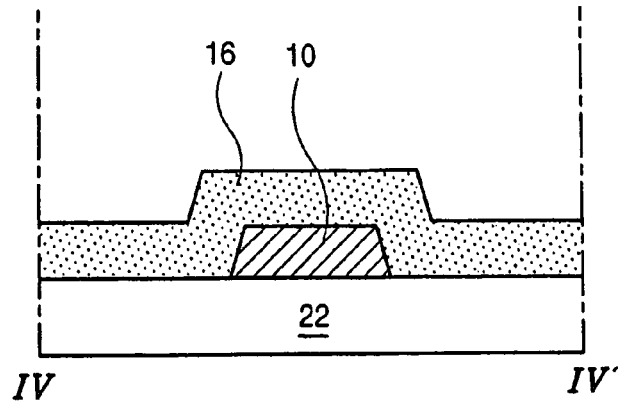
Figure 4F:
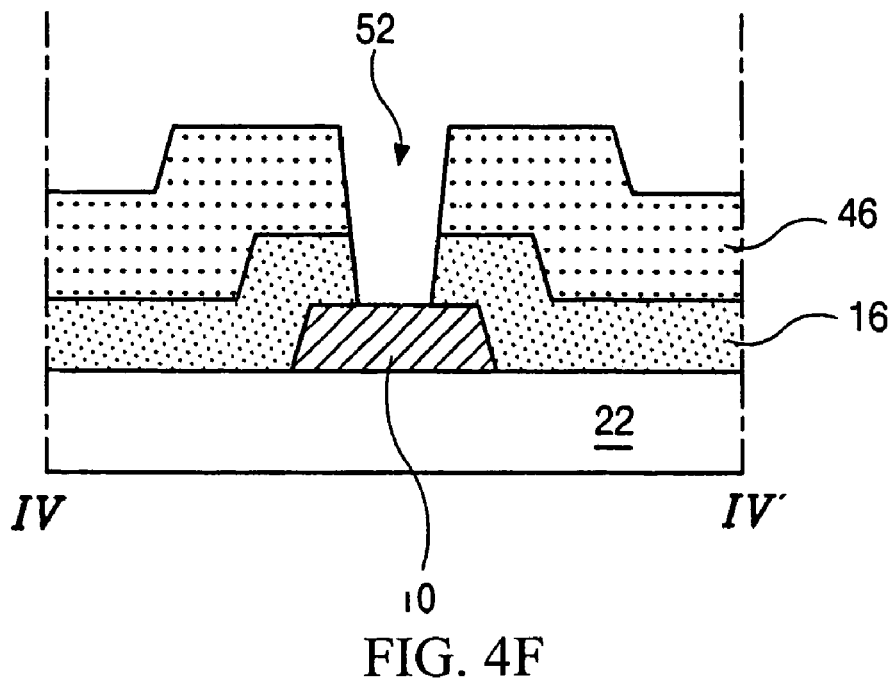
Figure 4G:
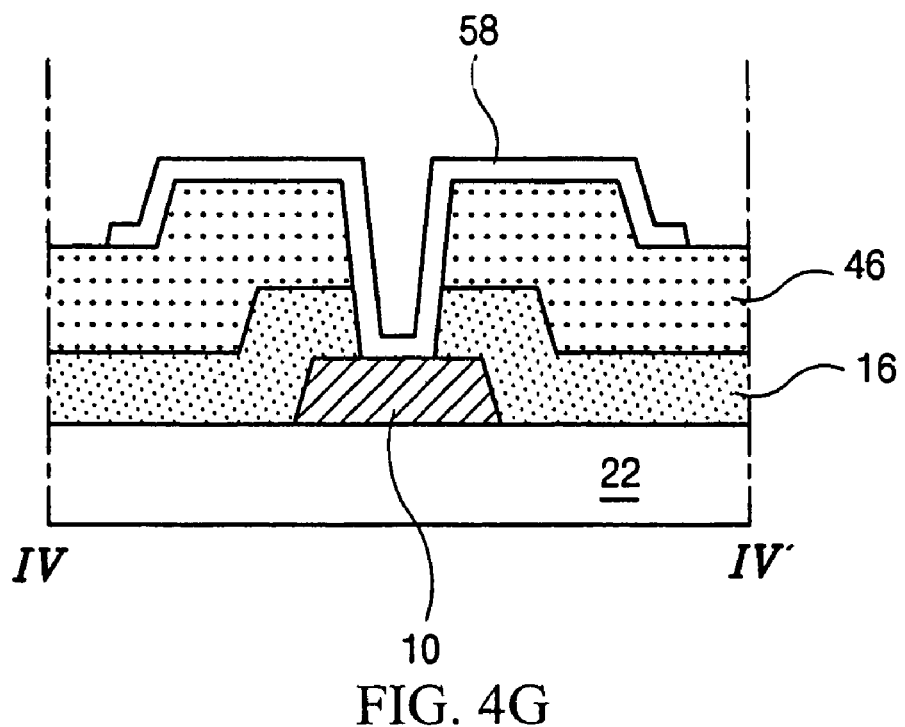
Figure 5A:
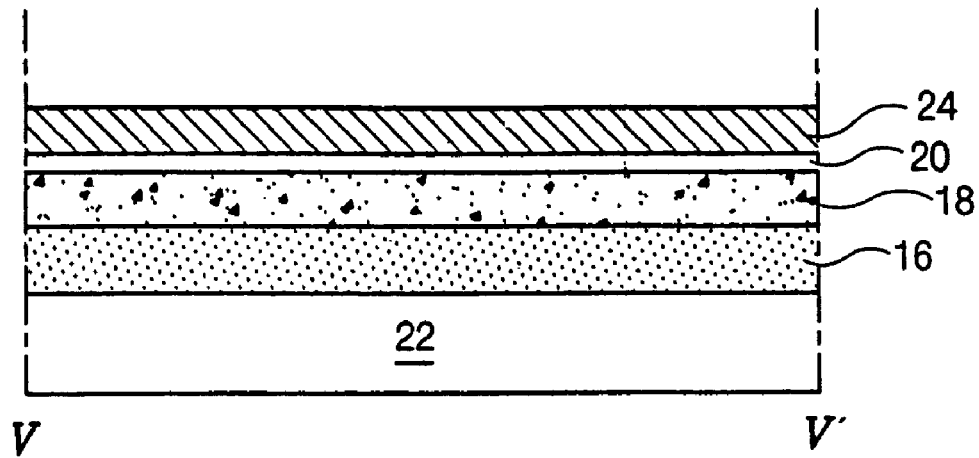
Figure 5B:
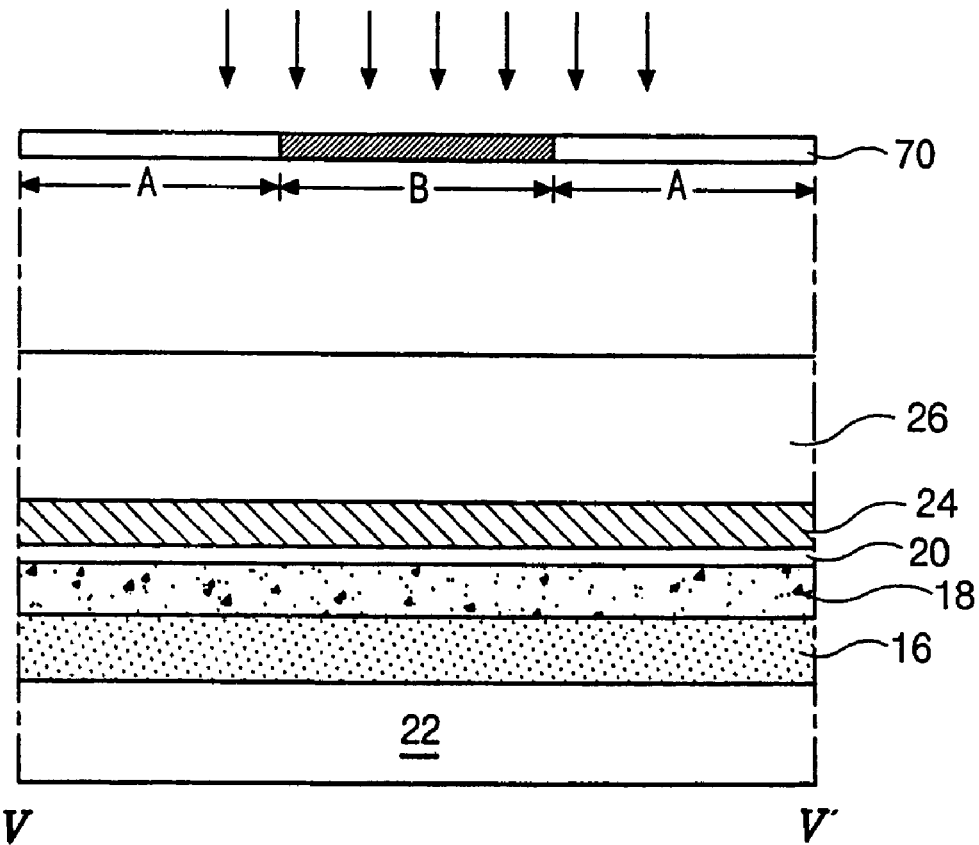
Figure 5C:
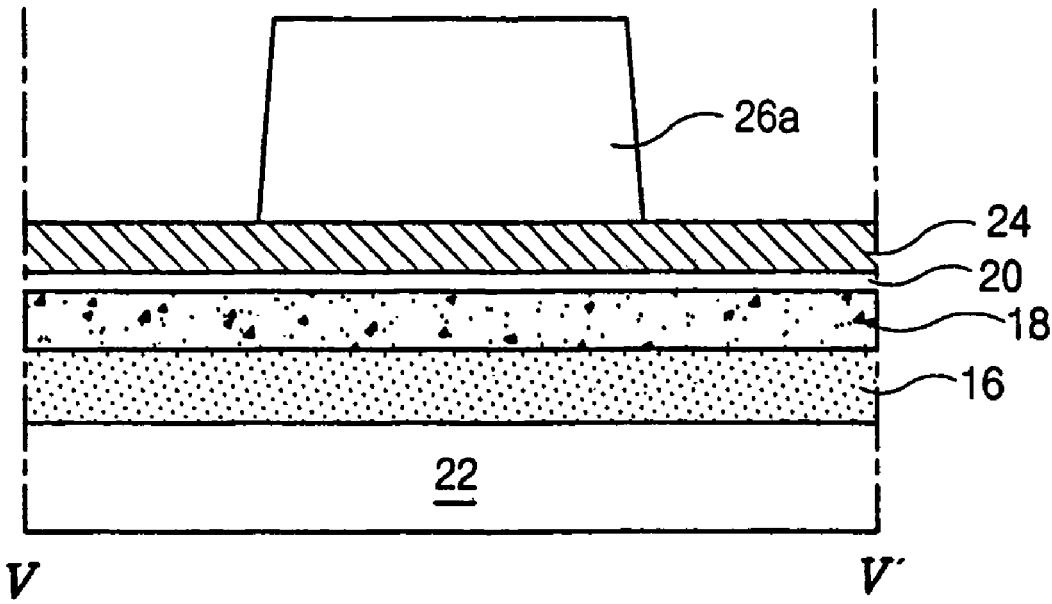
Figure 5D:
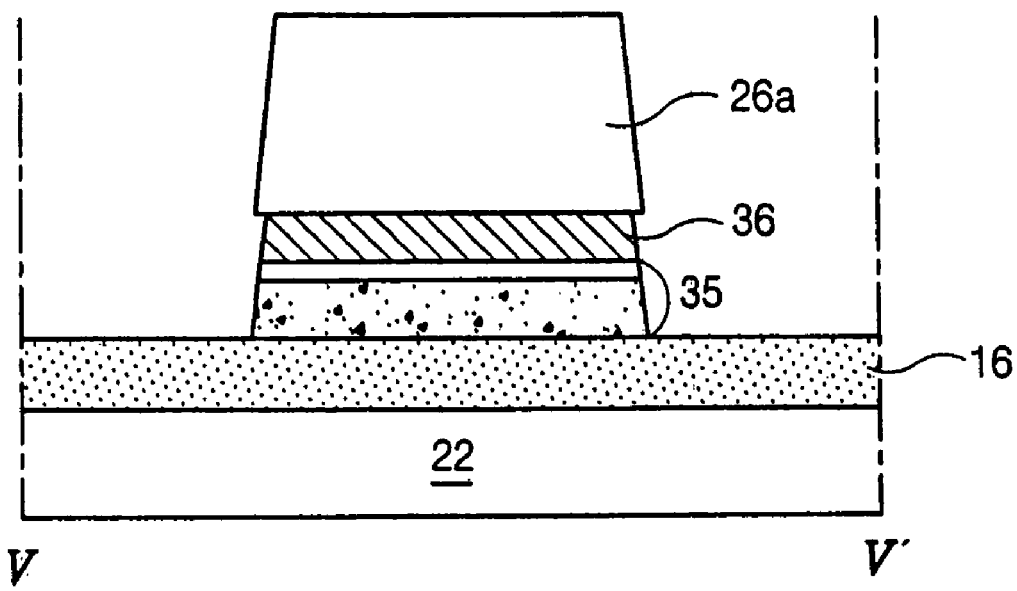
Figure 5E:
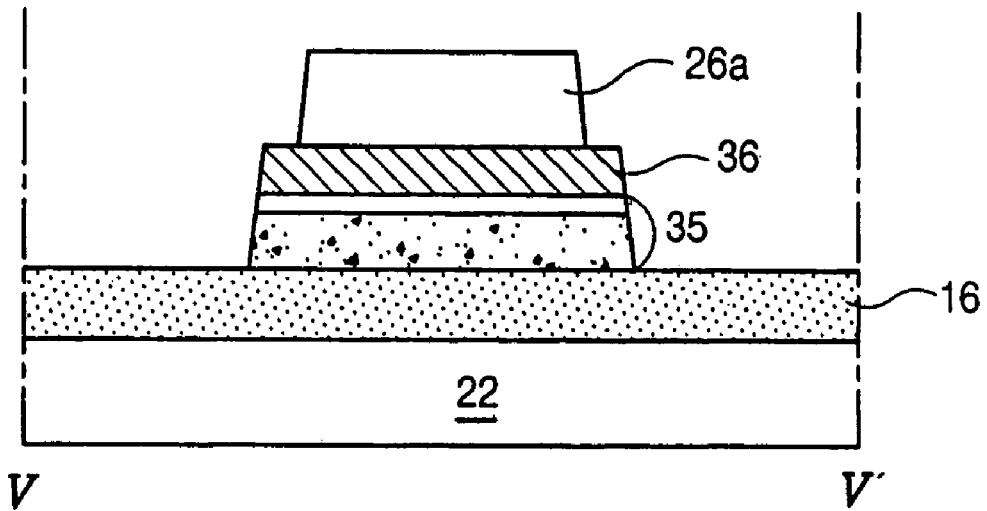
Figure 5F:
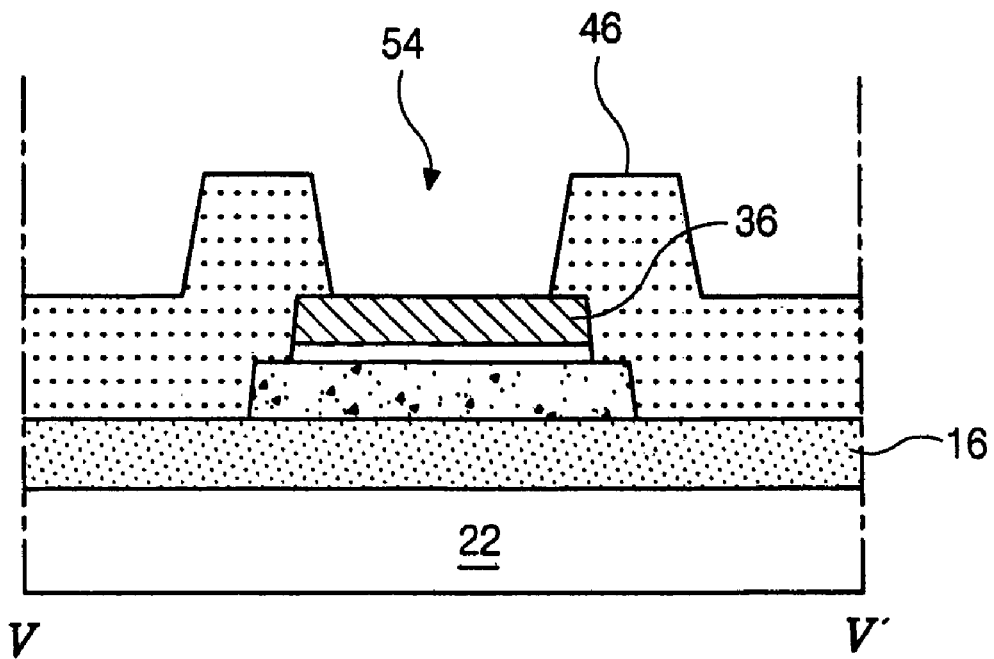
Figure 5G:
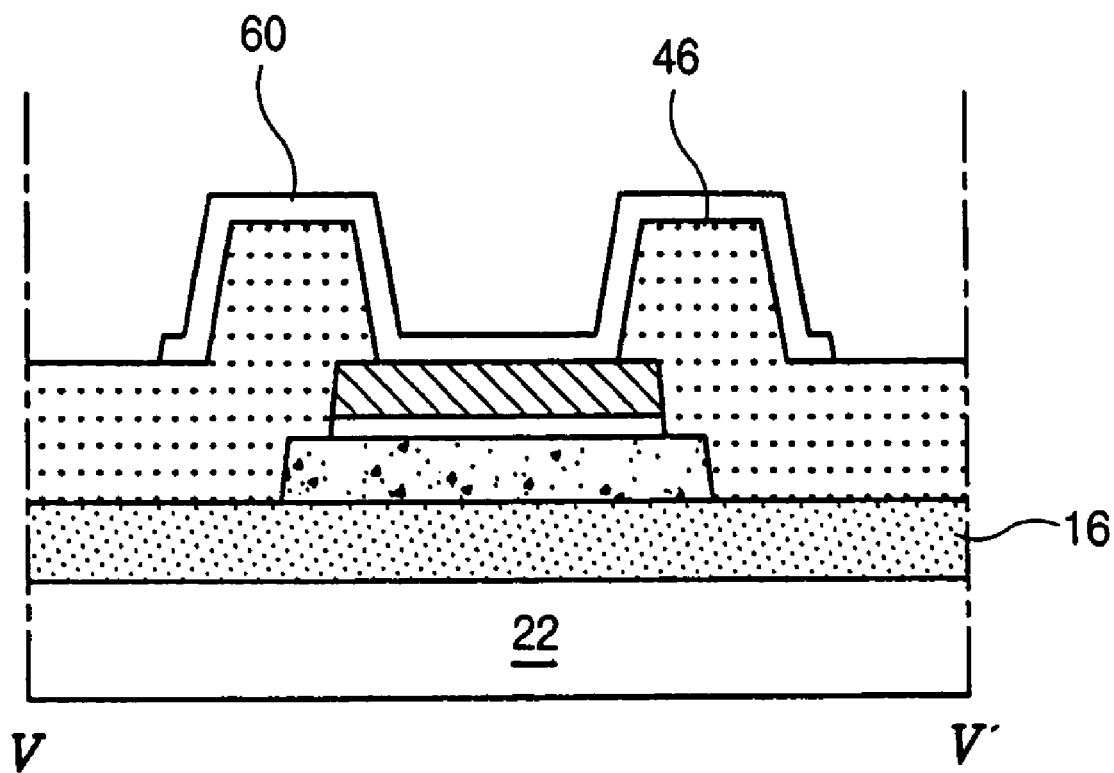
Figure 6:
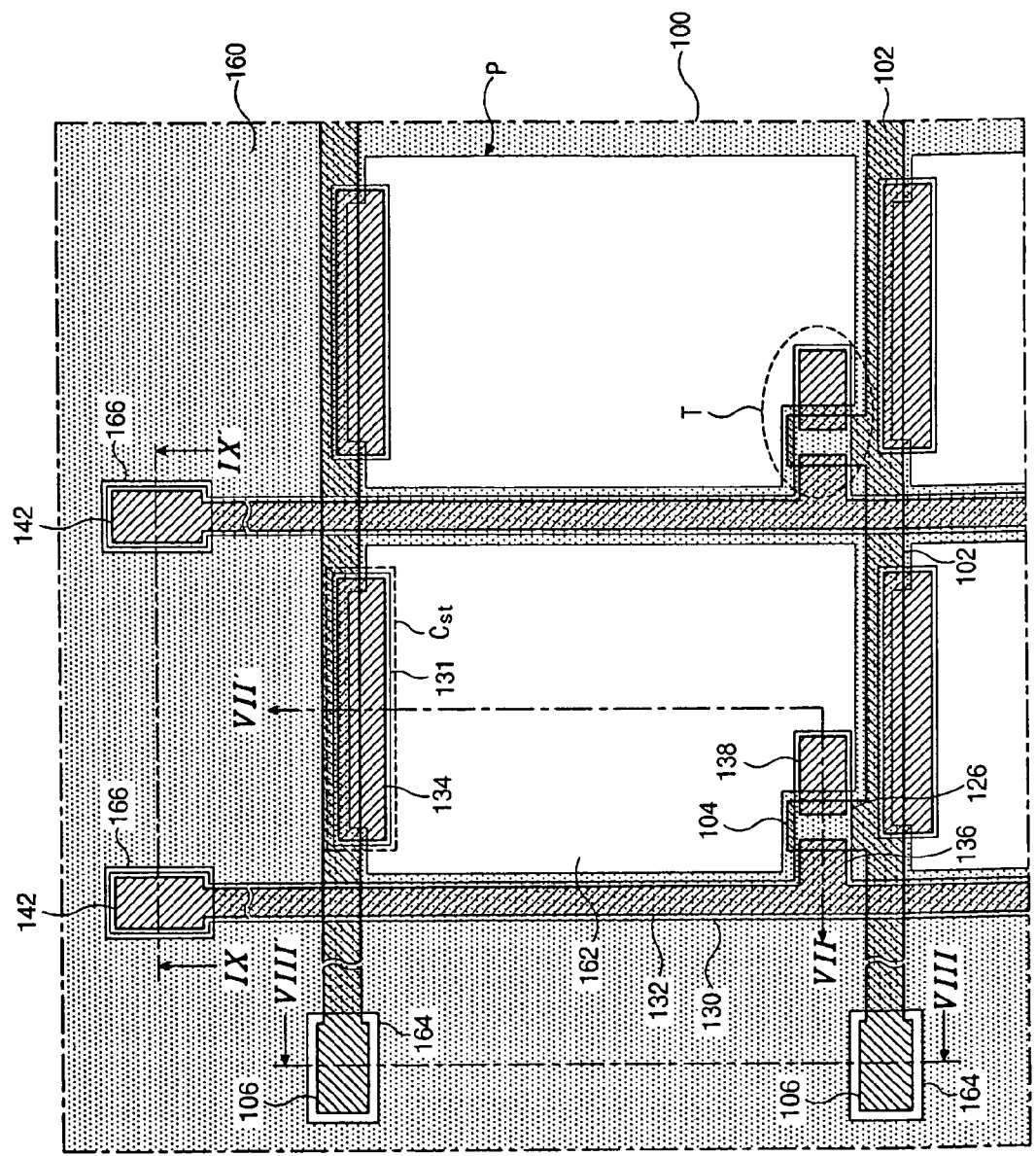
FIG. 6 is a plan view illustrating an array substrate for a liquid crystal display (LCD) device according to an embodiment of the present invention.

FIG. 6 is a plan view of an array substrate for a liquid crystal display (LCD) device according to an embodiment of the present invention.

As illustrated in FIG. 6, a plurality of gate lines 102 and a plurality of data lines 132 are formed on a transparent insulating substrate 100. The gate lines 102 and the data lines 132 cross each other and define a pixel region P. A thin film transistor T is formed as a switching element at each crossing of the gate and data lines 102 and 132. A gate pad 106 is formed at one end of the gate line 102 and a data pad 142 is formed at one end of the data line 132. A gate pad terminal 164 and a data pad terminal 166, which have an island shape and are made of a transparent conducting material, overlap the gate pad 106 and the data pad 142, respectively.

The thin film transistor T is composed of gate electrode 104 that is connected to the gate line 102 for receiving scanning signals, a source electrode 136 that is connected to the data line 132 for receiving data signals, and a drain electrode 138 that is spaced apart from the source electrode 136. The thin film transistor T further includes an active layer 126 between the gate electrode 104 and the source and drain electrodes 136 and 138. A metal pattern 134 of an island shape overlaps the gate line 102. The metal pattern 134 may be made of the same material as the data line 132.

A pixel electrode 162 is formed in each pixel region P. The pixel electrode 162 is directly connected to the drain electrode 138 and the metal pattern 134 without contact holes. The gate line 102 and the metal pattern 134 function as first and second storage capacitor electrodes, respectively, and form a storage capacitor Cst with a gate insulating layer (not shown) disposed between the gate line 102 and the metal pattern 134.

Although not shown in the figure, an ohmic contact layer is formed between the active layer 126 and the source and drain electrodes 136 and 138. The active layer 126 is made of amorphous silicon, and the ohmic contact layer is formed of doped amorphous silicon. A first pattern 130 and a second pattern 131, which include the amorphous silicon layer and the doped amorphous silicon layer, are formed. The first pattern 130 is located under the data line 132 and the data pad 142 and the second pattern 131 is situated under the metal pattern 134. Edges of the active layer 126 and the first and the second patterns 130 and 131 (i.e., the amorphous silicon layers of the first and second patterns 130 and 131) are exposed.

A passivation layer 160 is formed on an entire surface of the substrate 100, exposing the pixel electrode 162, the gate pad terminal 164 and the data pad terminal 166.

FIGS. 7A to 7H, FIGS. 8A to 8H, and FIGS. 9A to 9H illustrate a method of manufacturing an array substrate according to the embodiment of the present invention, and are cross-sections along the line VII-VII', the line VIII-VIII' and the line IX-IX' of FIG. 6, respectively.

Figure 7A:
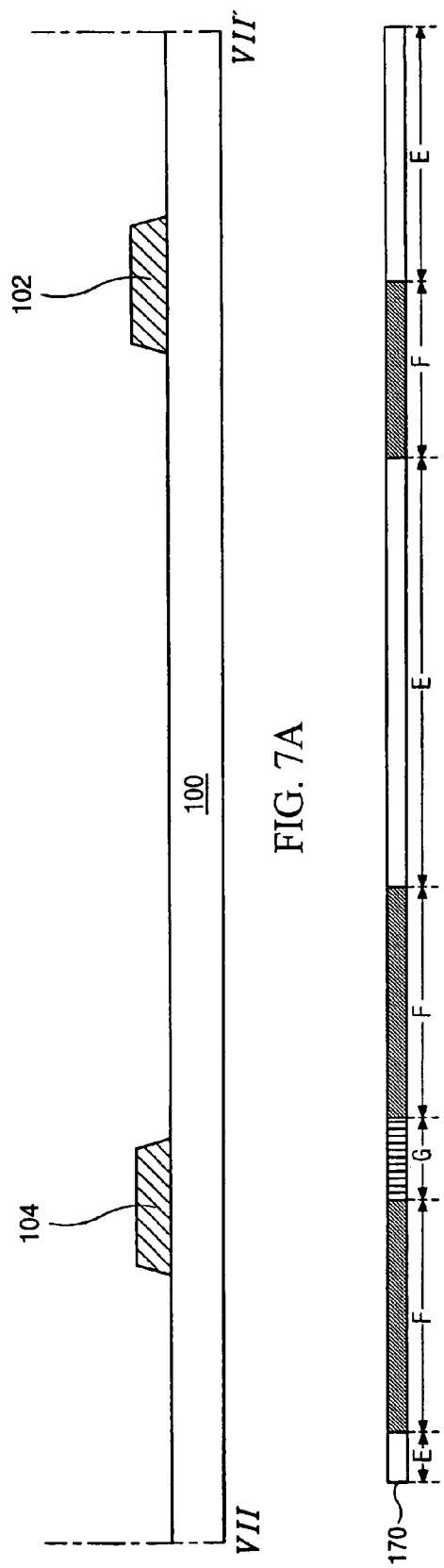
Figure 8A:
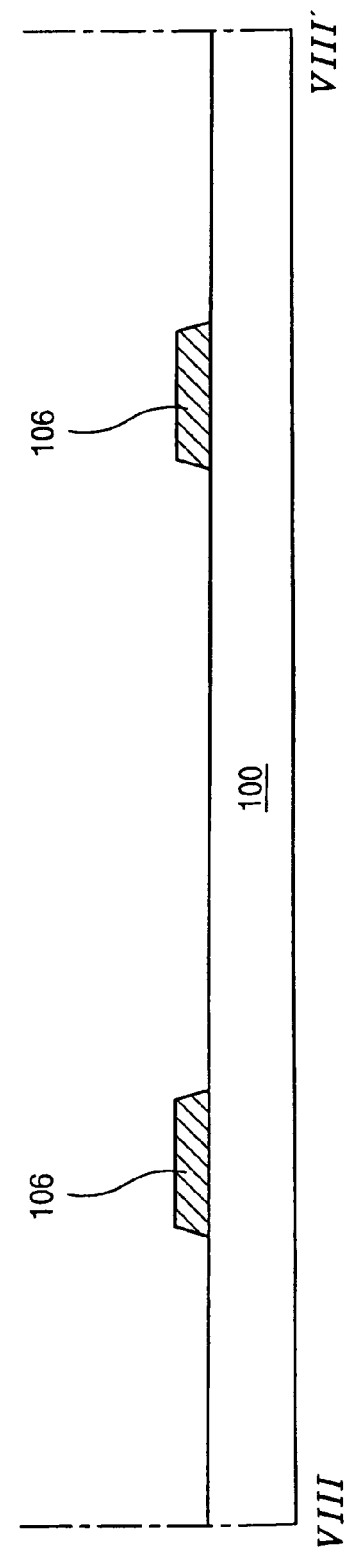
Figure 9A:
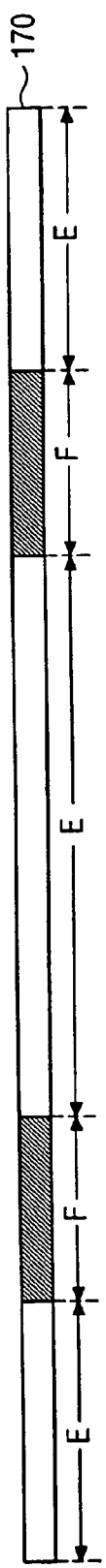

First, as illustrated in FIGS. 7A, 8A and 9A, a gate line 102, a gate electrode 104, and a gate pad 106 are formed on a transparent insulating substrate 100 by depositing a first metal layer and patterning the first metal layer through a first photolithography process using a first mask, i.e., a first mask process. As stated above, the gate electrode 104 is extended from the gate line 102, and the gate pad 106 is situated at one end of the gate line 102. The gate line 102, the gate electrode 104 and the gate pad 106 are made of a metal material such as aluminum (Al), molybdenum (Mo), tungsten (W), and chromium (Cr). In order to prevent resistance capacitance (RC) delay, aluminum (Al), which has a relatively low resistivity, is widely used as a gate electrode material. However, pure aluminum is easily corroded by acid and may cause line defects due to hillocks in the following process under high temperatures. Therefore, an aluminum alloy may be used or a double layer including aluminum and other metal material, such as molybdenum.

Figure 7B:
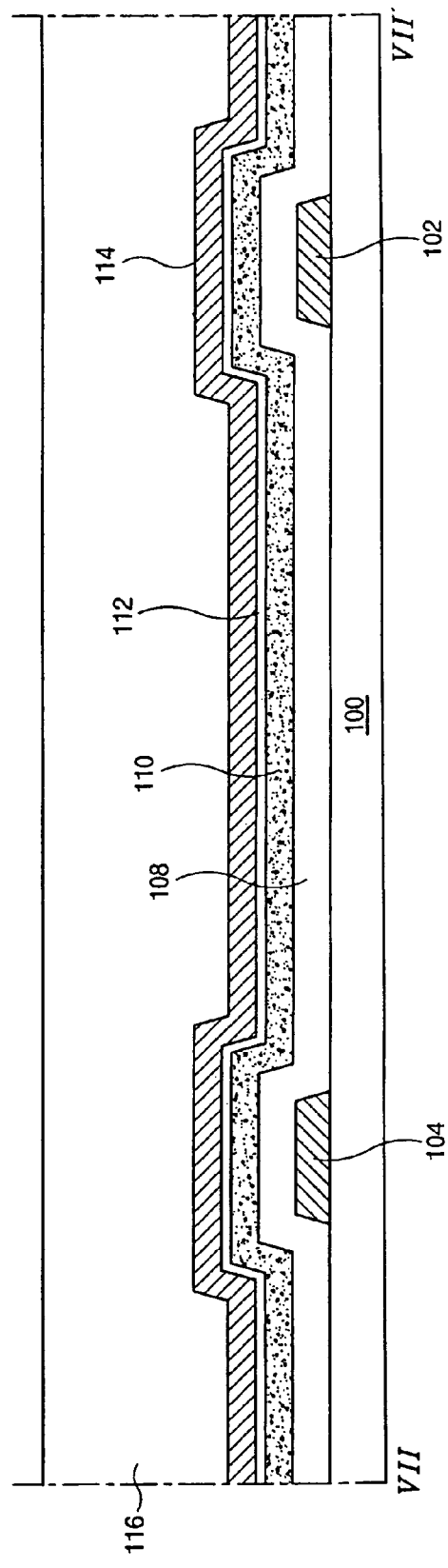
Figure 8B:
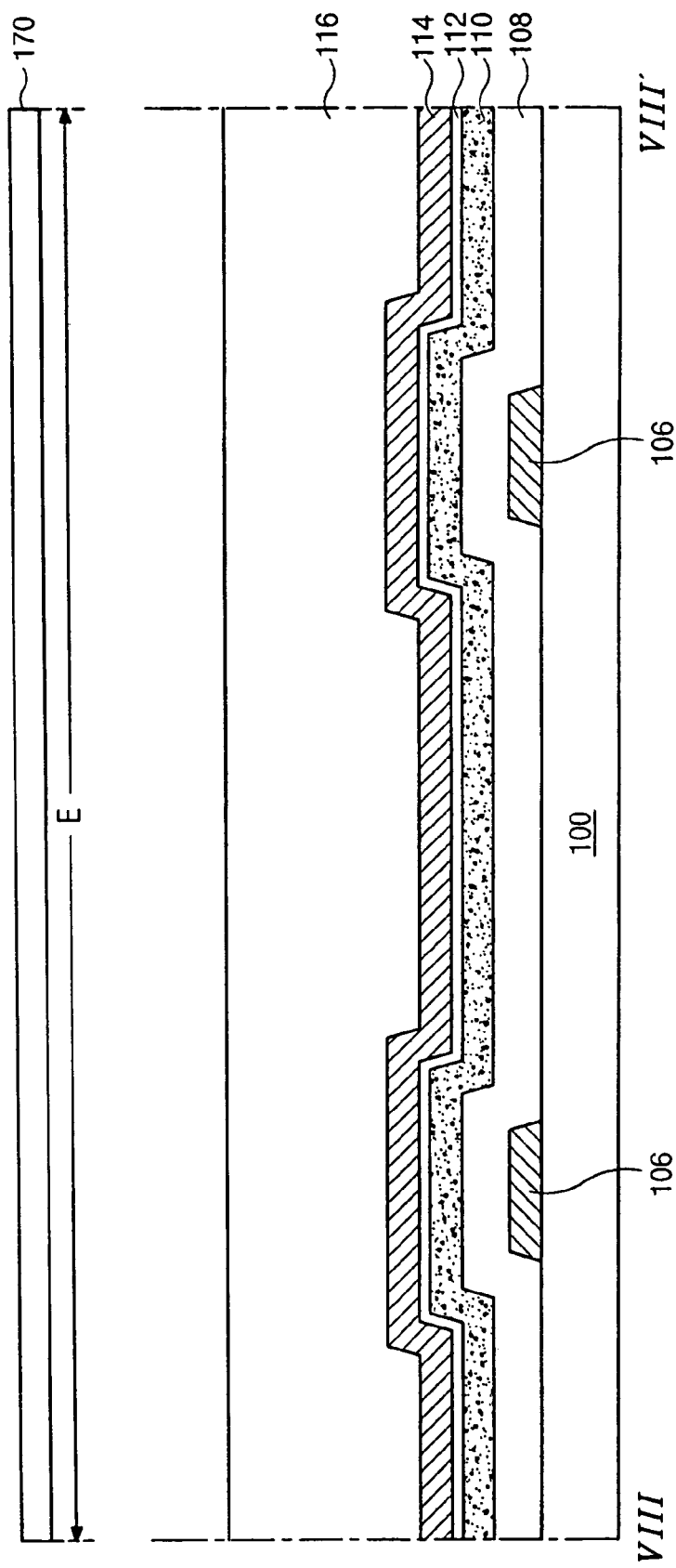
Figure 9B:
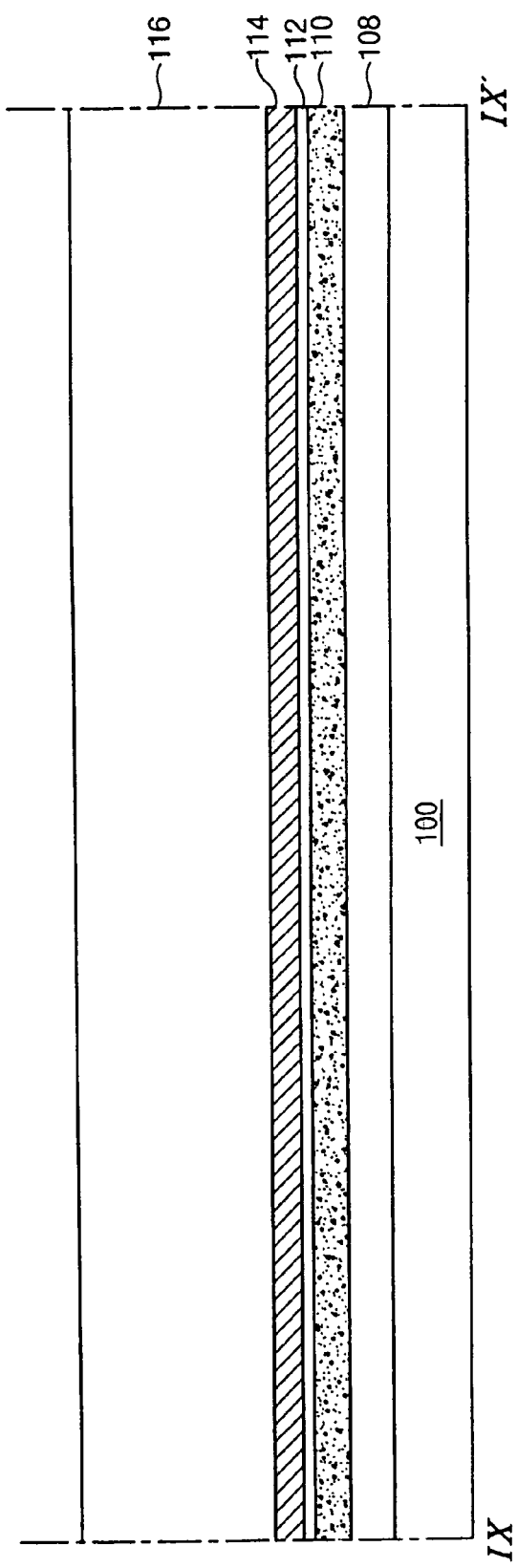

As illustrated in FIGS. 7B, 8B and 9B, a gate insulating layer 108, an amorphous silicon layer 110, a doped amorphous silicon layer 112 and a second metal layer 114 are subsequently deposited on the substrate 100 including the gate line 102, the gate electrode 104 and the gate pad 106 thereon. The gate insulating layer 108 is made of an inorganic insulating material such as silicon nitride (SiNx) and silicon oxide (SiO$_2$). The gate insulating layer 108 may be formed of an organic insulating material such as benzocyclobutene (BCB) and acrylic resin. The second metal layer 114 is made of one of chromium, molybdenum, tungsten and tantalum (Ta).

Next, a photoresist layer 116 is formed on the second metal layer 114 by coating photoresist. A second mask 170, which has a transmitting portion E, a blocking portion F and a half transmitting portion G, is disposed over and spaced apart from the photoresist layer 116. The half transmitting portion G may include slits and corresponds to a channel of a thin film transistor. The photoresist layer 116 may be a positive type, and thus a portion exposed to light is developed and removed. Subsequently, the photoresist layer 116 is exposed to light, and the photoresist layer 116 corresponding to the half transmitting portion G is exposed less than the photoresist layer 116 corresponding to the transmitting portion E.

Figure 7C:
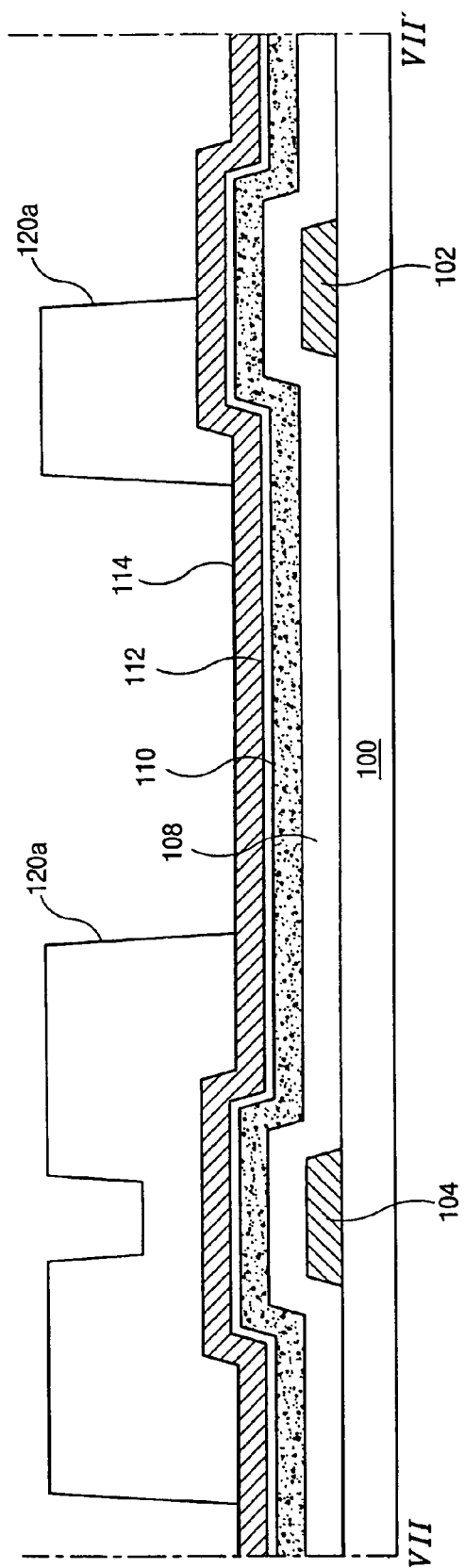
Figure 9C:
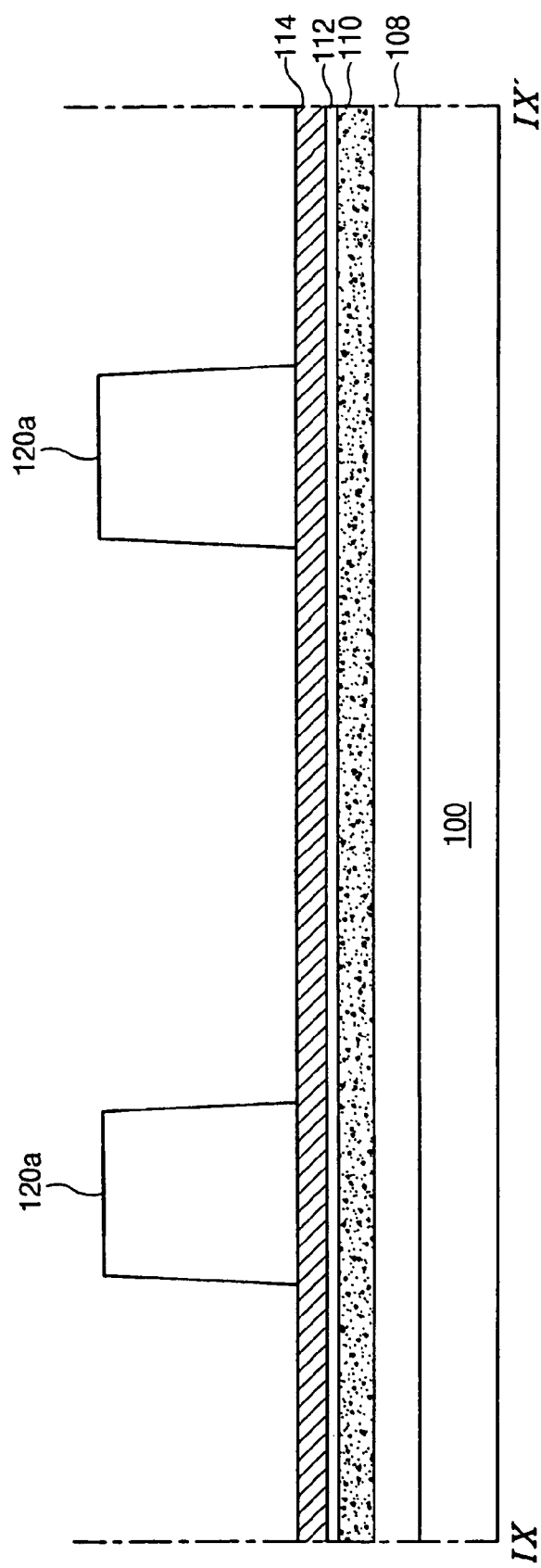

As illustrated in FIGS. 7C, 8C and 9C, the photoresist layer 116 of FIGS. 7B, 8B and 9B is developed, and a photoresist pattern 120a having different thicknesses is formed. A first thickness of the photoresist pattern 120a corresponds to the blocking portion F of FIGS. 7B, 8B and 9B, and a second thickness of the photoresist pattern 120a, which is thinner than the first thickness, corresponds to the half transmitting portion G of FIG. 7B.

Figure 7D:
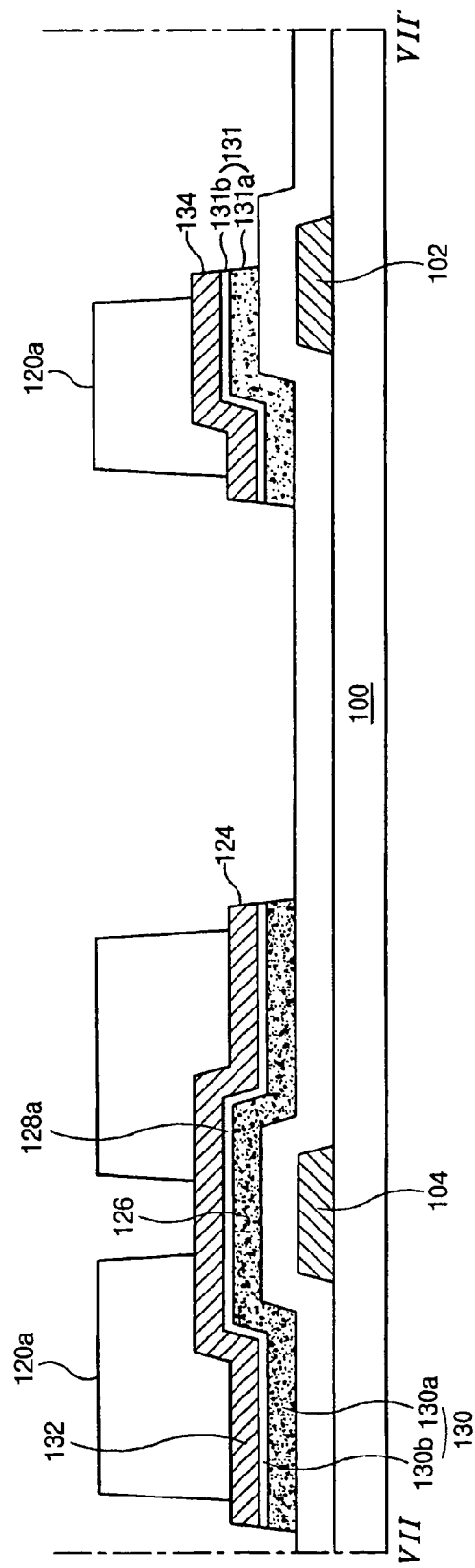
Figure 9D:
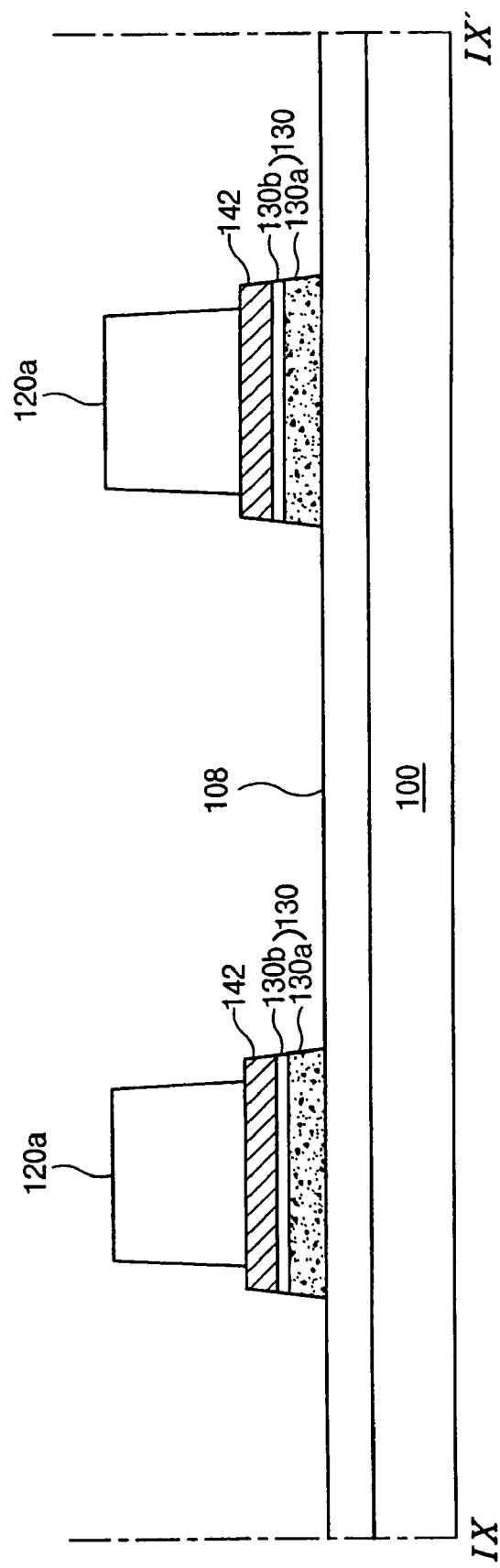

As illustrated in FIGS. 7D, 8D and 9D, the second metal layer 114, the doped amorphous silicon layer 112 and the amorphous silicon layer 110 of FIGS. 7C, 8C and 9C exposed by the photoresist pattern 120a are removed. Thus a source and drain pattern 124, a data line 132, a data pad 142, a doped amorphous silicon pattern 128a and an active layer 126 are formed. At this time, a metal pattern 134 of an island shape is also formed over the gate line 102. Next, the second thickness of the photoresist pattern 120a is removed through an ashing process, and thus the middle portion of the source and drain pattern 124 is exposed. Here, the first thickness of the photoresist pattern 120a is also removed partially and the first thickness of the photoresist pattern 120a is thinned. Additionally, edges of the photoresist pattern 120a are removed, and the metal patterns 124, 130, 134 and 142 are exposed.

In addition, a first pattern 130 and a second pattern 131, which include the amorphous silicon layer 130a and 131a and the doped amorphous silicon layer 130b and 131b, are formed. The first pattern 130 is located under the data line 132 and the data pad 142 and the second pattern 131 is situated under the metal pattern 134.

The second metal layer 114 of FIGS. 7C, 8C and 9C may be etched by a wet etching method, and the doped amorphous silicon layer 112 and the amorphous silicon layer 110 FIGS. 7C, 8C and 9C may be patterned by a dry etching method. The source and drain pattern 124 is formed over the gate electrode 104 and is connected to the data line 132, which extends vertically in the context of the figure. The data pad 142 is disposed to one end of the data line 132, as mentioned before. The doped amorphous silicon pattern 128a and the active layer 126 have the same shape as the source and drain pattern 124 and the data line 132.

Figure 7E:
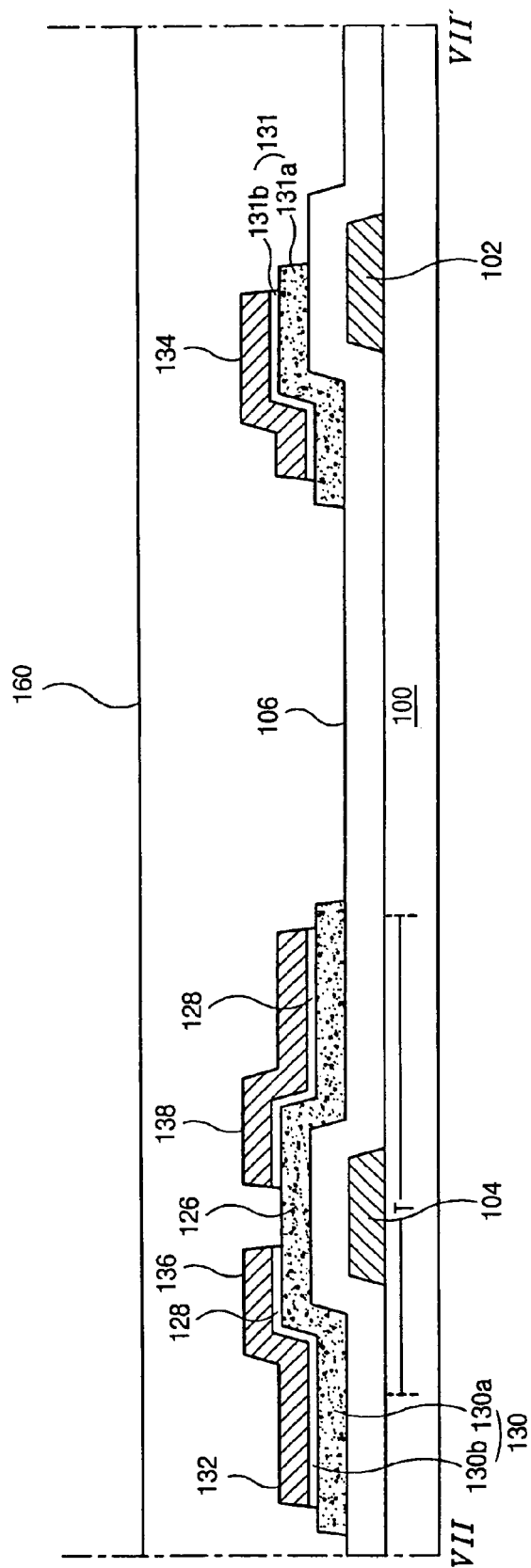
Figure 8E:
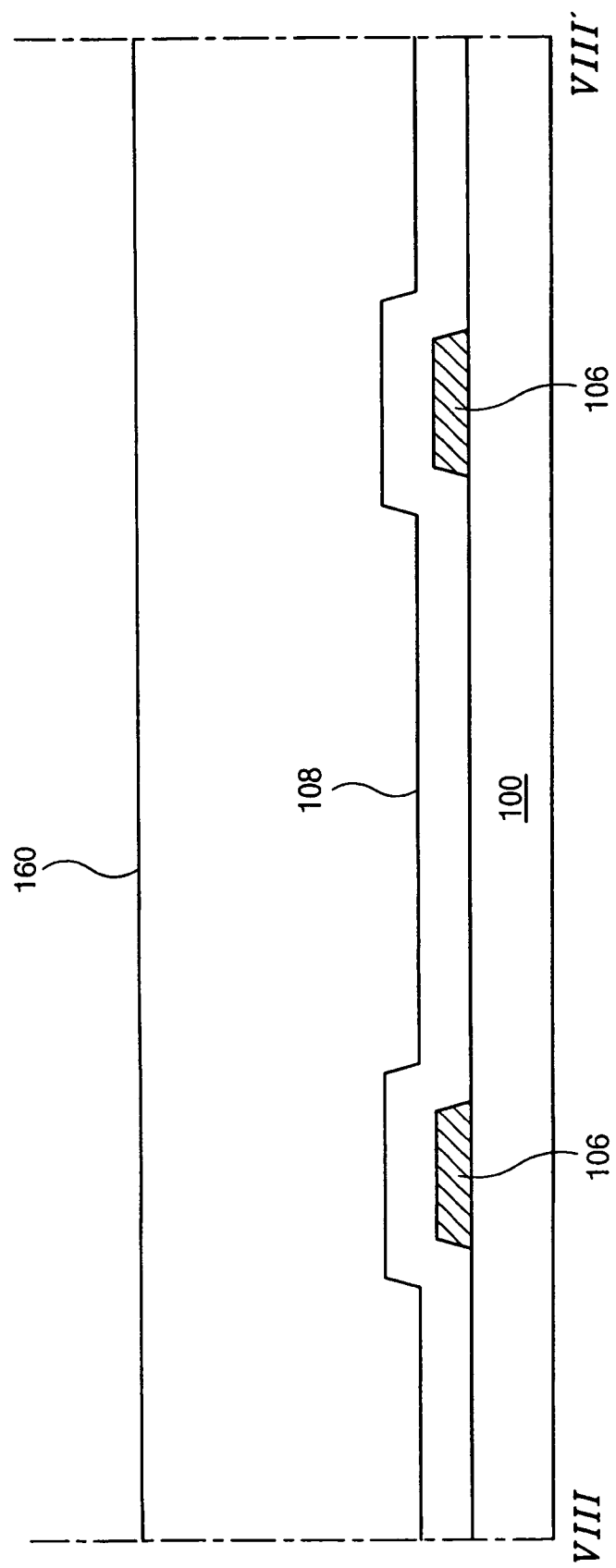

Next, as illustrated in FIGS. 7E, 8E and 9E, the source and drain pattern 124 and the doped amorphous silicon pattern 128a of FIG. 7D, which are exposed by the photoresist pattern 120a of FIG. 7D, are etched. Thus, source and drain electrodes 136 and 138 and an ohmic contact layer 128 are formed, and the active layer 126 is exposed. The exposed active layer 126 between the source and drain electrodes 136 and 138 becomes a channel of a thin film transistor T and corresponds to the half transmitting portion G of the second mask 170 of FIG. 7B. The gate electrode 104, the active layer 126, the source electrode 136 and the drain electrode 138 constitute the thin film transistor T. The source and drain electrodes 136 and 138 are spaced apart from each other. The active layer 126 has the same shape as the source and drain electrodes 136 and 138 and also includes an additional portion between the source and drain electrodes 136 and 138. At this time, edges of the amorphous silicon layers 126, 130a, 131a, which are disposed under the source and drain electrodes 136 and 138, the data line 132, the data pad 142 and the metal pattern 134, are also exposed.

If the source and drain pattern 124 of FIG. 7D is formed of molybdenum (Mo), the source and drain pattern 124 and the doped amorphous silicon pattern 128a of FIG. 7D can be removed using the dry etching method at one time. However, if the source and drain pattern 124 is formed of chromium (Cr), the source and drain pattern 124 may be etched by the wet etching method, and then the doped amorphous silicon pattern 128a may be removed by the dry etching method.

As stated above, the source and drain electrodes 136 and 138, the data line 132, the data pad 142, the metal pattern 134, the ohmic contact layer 128 and the active layer 126 are formed through a second mask process using the second mask 170 of FIGS. 7B, 8B and 9B.

Next, the photoresist pattern 120a of FIGS. 7D, 8D and 9D is removed, a passivation layer 160 is formed on an entire surface of the substrate 100, where the source and drain electrodes 136 and 138, the data line 132, the data pad electrode 142 and the metal pattern 134 are formed, by coating a photosensitive organic material such as benzocyclobutene (BCB) and acrylic resin.

Figure 7F:
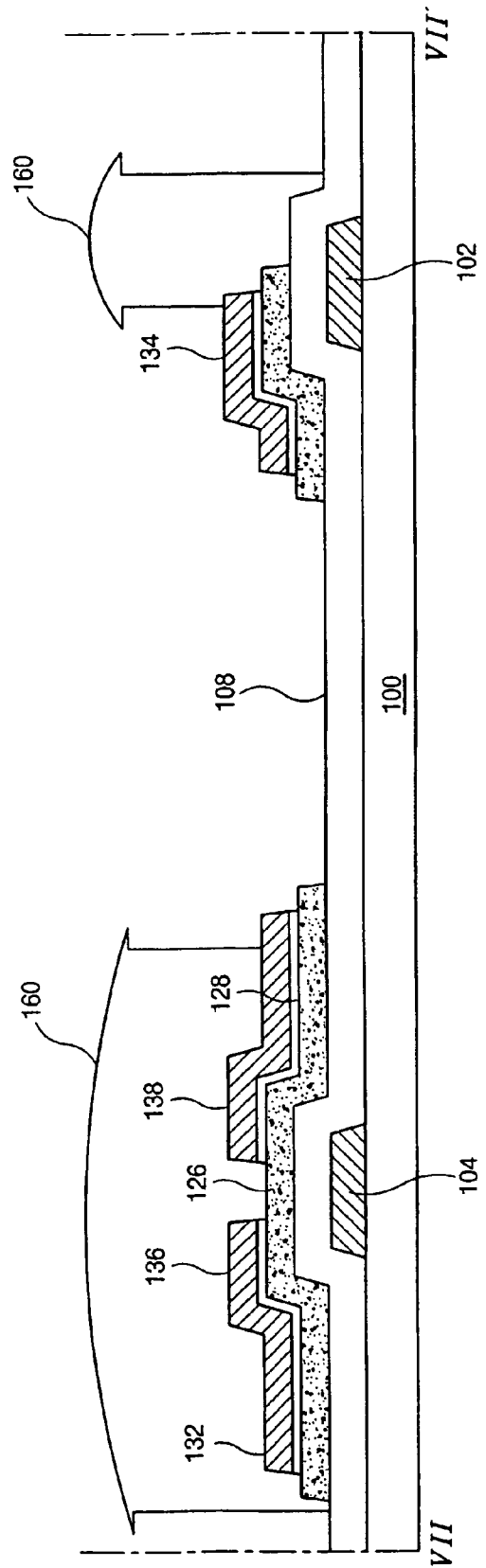
Figure 8F:
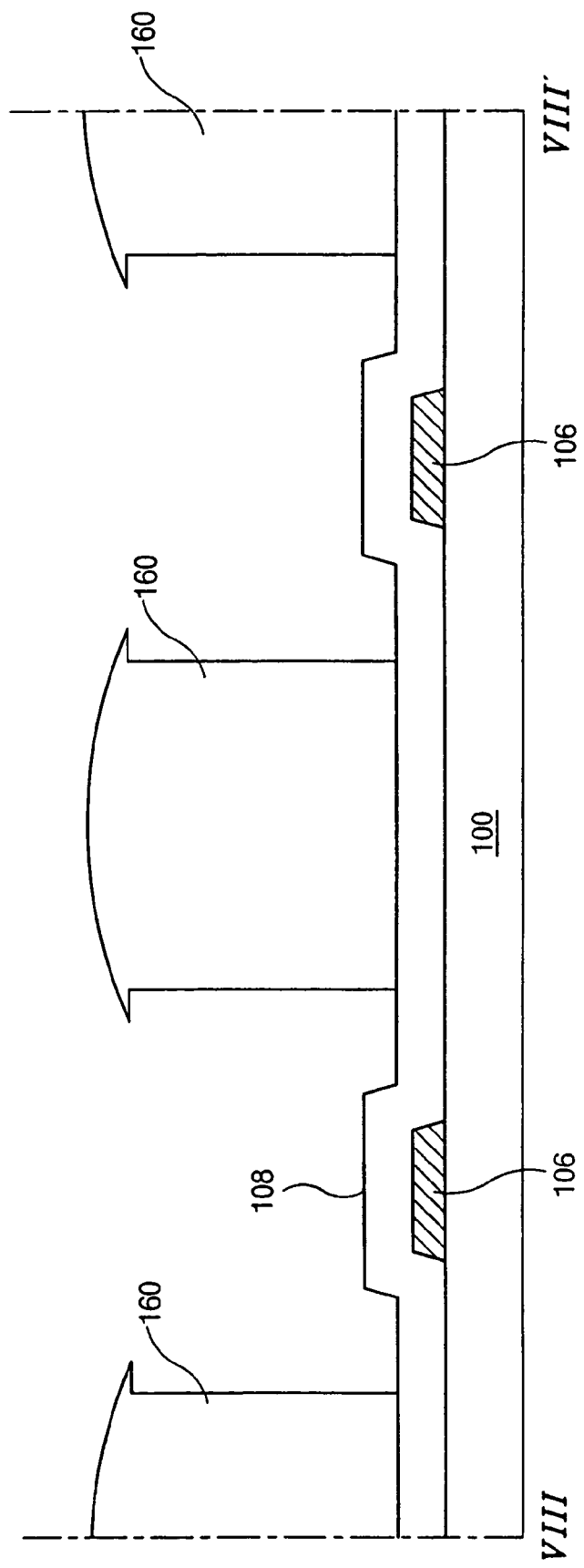

As illustrated in FIGS. 7F, 8F and 9F, the passivation layer 160 is exposed to light and developed through a third photolithography process using a third mask. Then, the passivation layer 160 remains over the data line 132, the source and drain electrodes 136 and 138, the metal pattern 134 and pad portions, where the gate pads 106 and the data pads 142 are formed, exposing the pixel region, the gate pad 106 and the data pad 142. Here, parts of the drain electrode 138 and the metal pattern 134 are also exposed. The gate pad 106 is still covered with the gate insulating layer 108.

The remaining passivation layer 160 is cured under fixed temperatures, and thus the passivation layer 160 has a surface of a circular arc. At this time, the sides of the passivation layer 160 should be reversely tapered, having an angle smaller than 90 degrees. This is obtainable by performing a process of curing the passivation layer 160 not one time but several times.

Figure 7G:
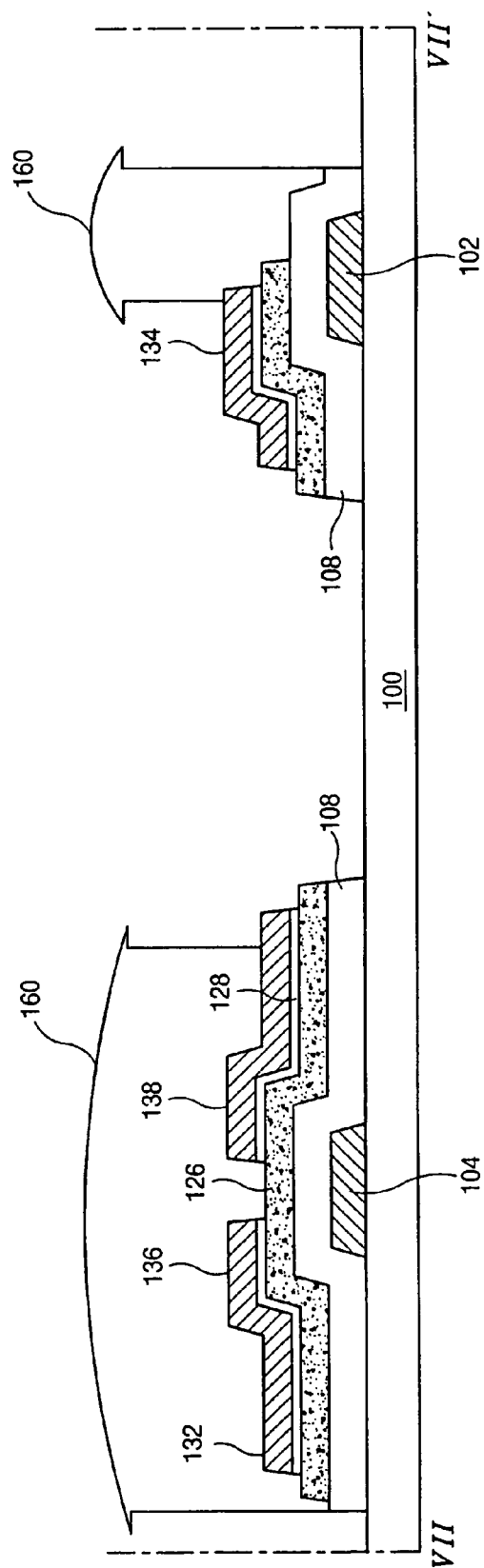
Figure 8G:
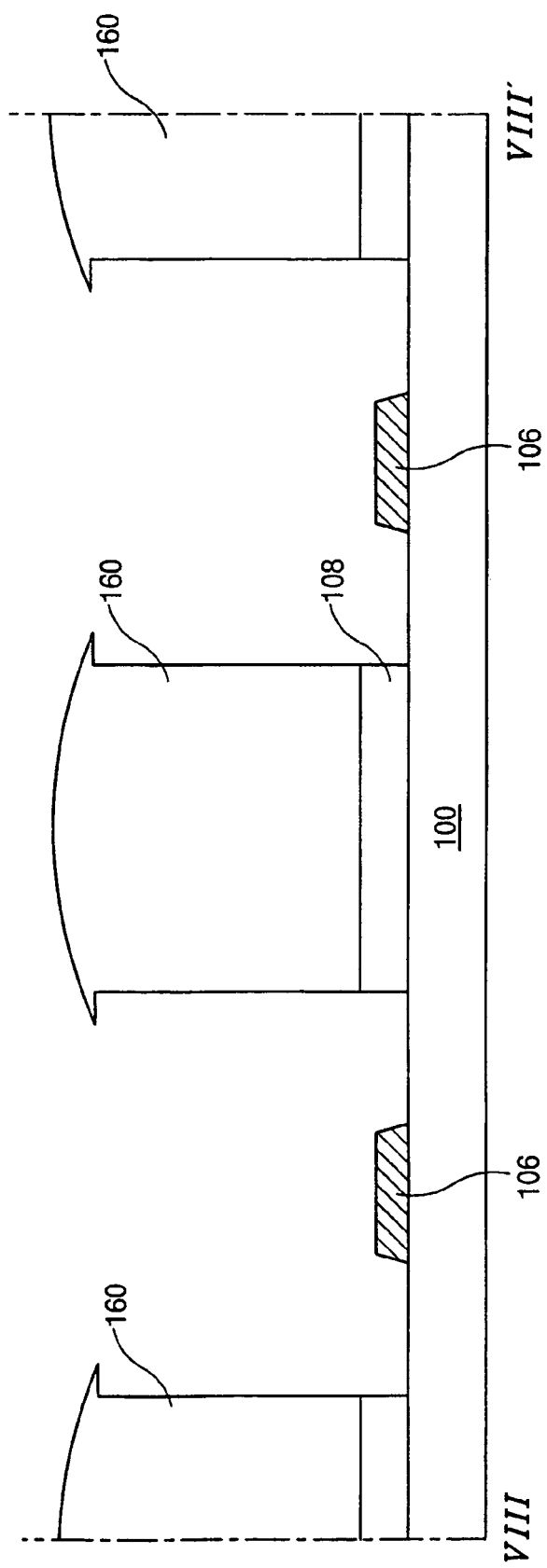
Figure 9G:
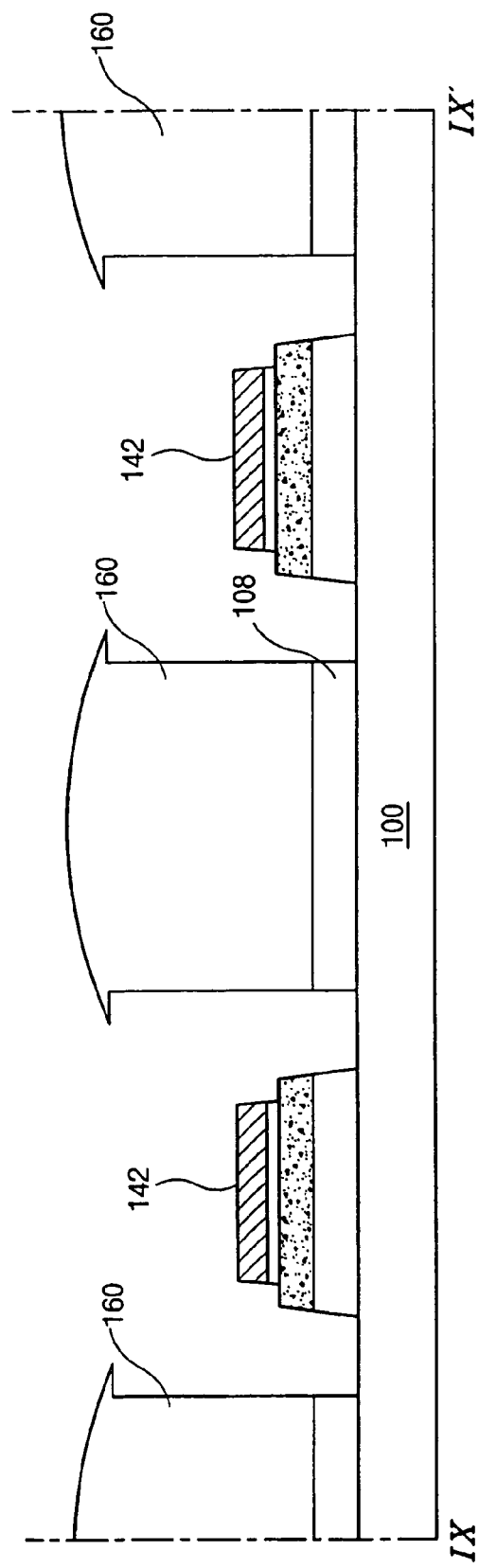

As illustrated in FIGS. 7G, 8G and 9G, the gate insulating layer 108 exposed by the passivation layer 160 is removed, thereby exposing the gate pad 106. At this time, the substrate 100 in the pixel region is also exposed.

Figure 7H:
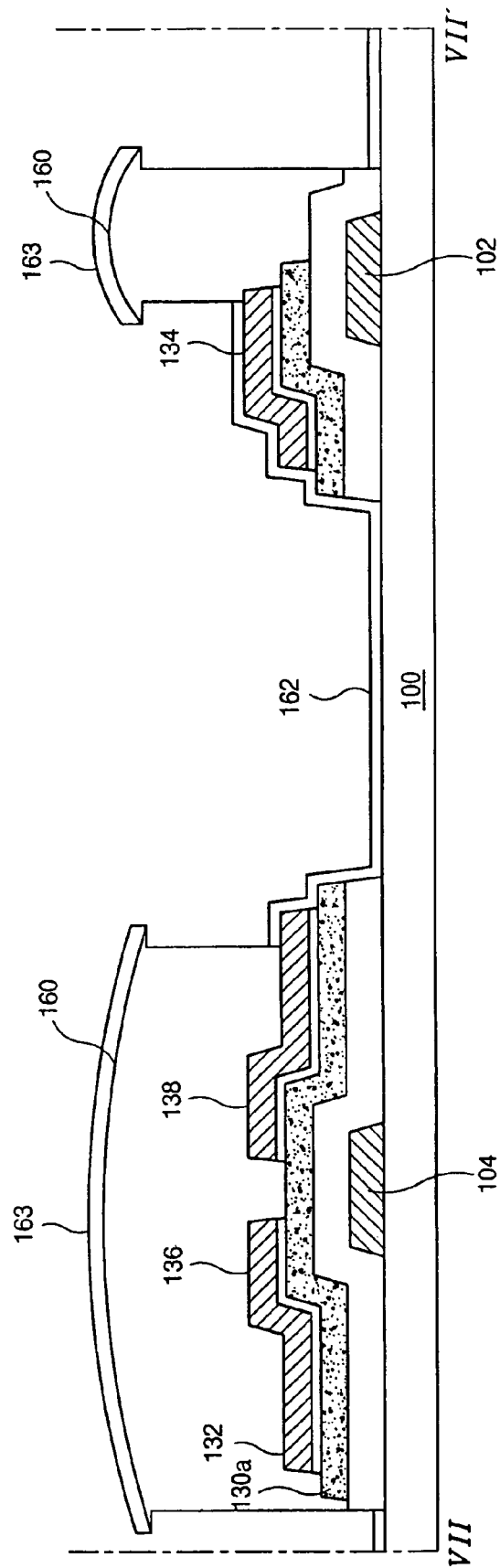
Figure 8H:
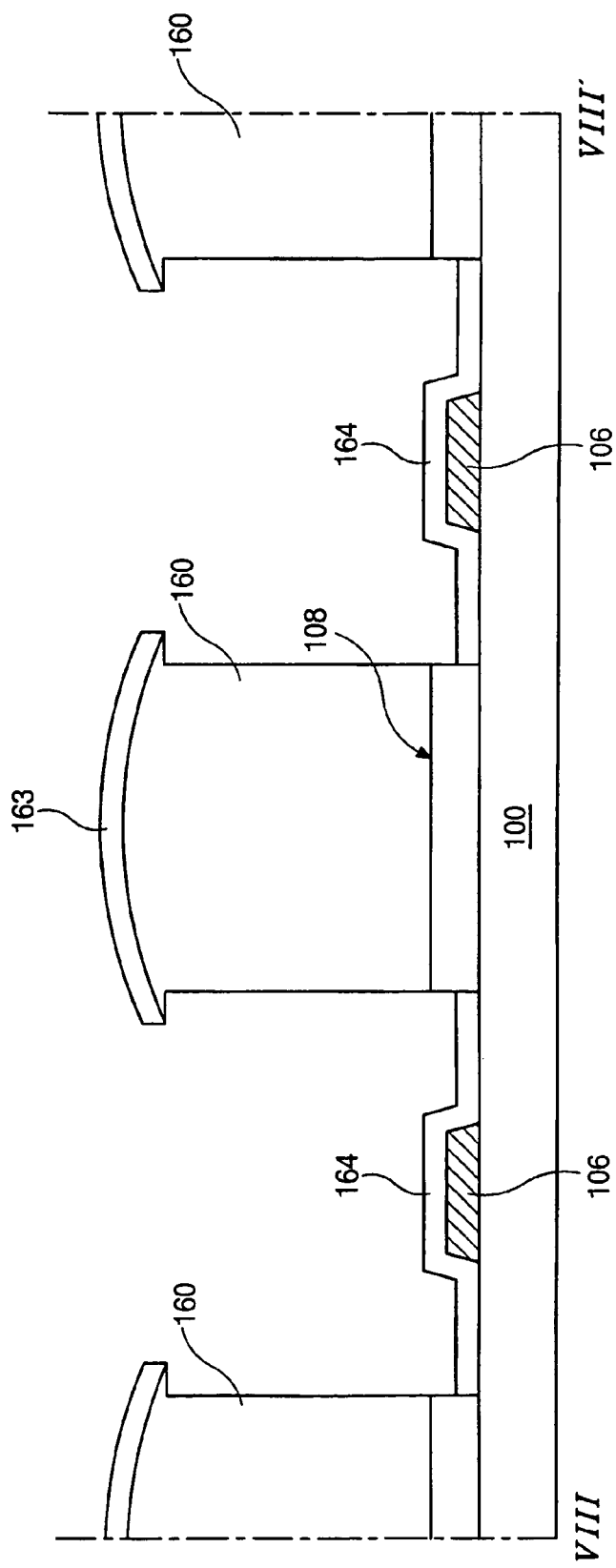
Figure 8H:
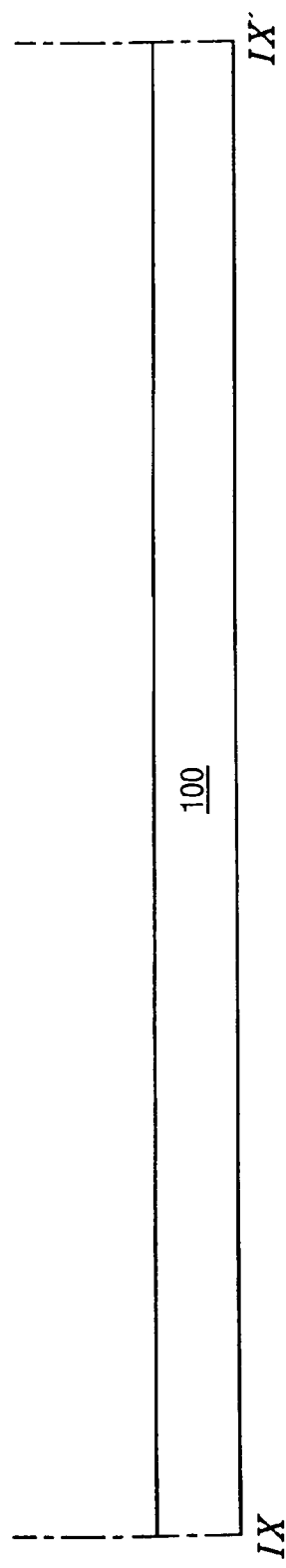
Figure 9H:
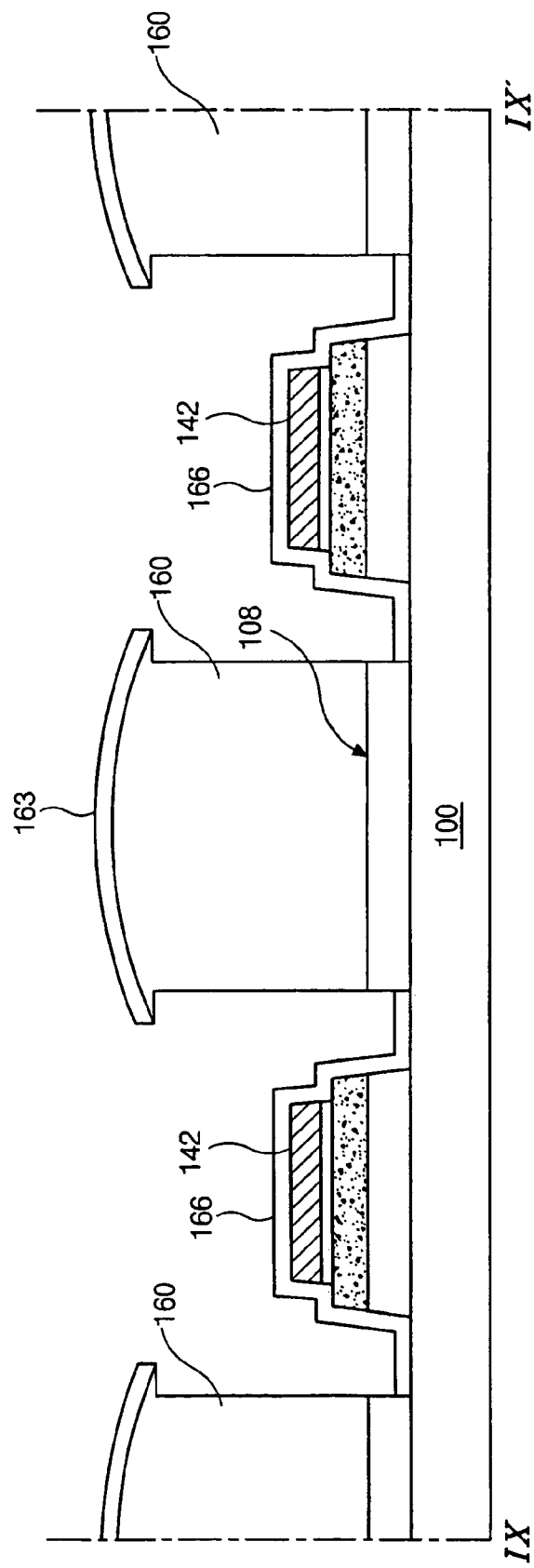

As illustrated in FIGS. 7H, 8H and 9H, a pixel electrode 162, a gate pad terminal 164 and a data pad terminal 166 are formed on the substrate 100 including the passivation layer 160 by depositing a transparent conductive material such as indium-tin-oxide (ITO) and indium-zinc-oxide (IZO). The pixel electrode 162 is disposed in the pixel region and is directly connected to not only the drain electrode 138 but also the metal pattern 134 without contact holes. The metal pattern 134 forms storage capacitor with the gate line 102 and the gate insulating layer between the gate line 102 and the metal pattern 134. The pixel electrode 162 contacts the substrate 100 in the pixel region. The gate pad terminal 164 and the data pad terminal 166 cover and are in contact with the gate pad 106 and the data pad 142, respectively. Since the passivation layer 160 is patterned, the pixel electrode 162, the gate pad terminal 164 and the data pad terminal 166 are disposed between patterns of the passivation layer 160.

The pixel electrode 162, the gate pad terminal 164 and the data pad terminal 166 can be formed in respective patterns without a photolithography process due to the passivation layer having the reversely tapered sides. Here, transparent conductive patterns 163 are also formed on the passivation layer 160.

In the above-mentioned embodiment, the passivation layer 160 of the organic material is directly formed on the thin film transistor T and the passivation layer 160 contacts the active layer 126 of the thin film transistor T. To improve contact characteristics between the active layer 126 and the passivation layer 160, an inorganic insulating pattern may be formed between the passivation layer 160 and the thin film transistor T.

Hereinafter, another embodiment of the present invention will be described with reference to attached FIG. 10, FIG. 11 and FIG. 12.

Figure 10:
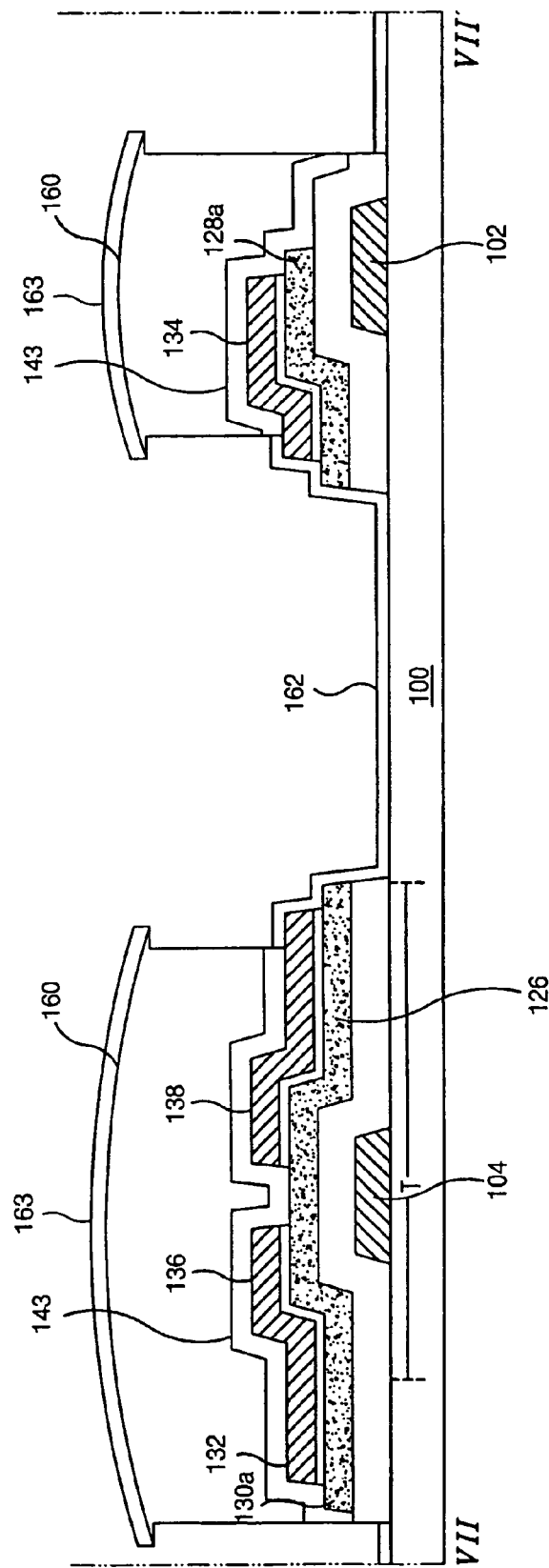
FIG. 10, FIG. 11 and FIG. 12 are cross-sectional views illustrating an array substrate according to another embodiment of the present.
Figure 11:
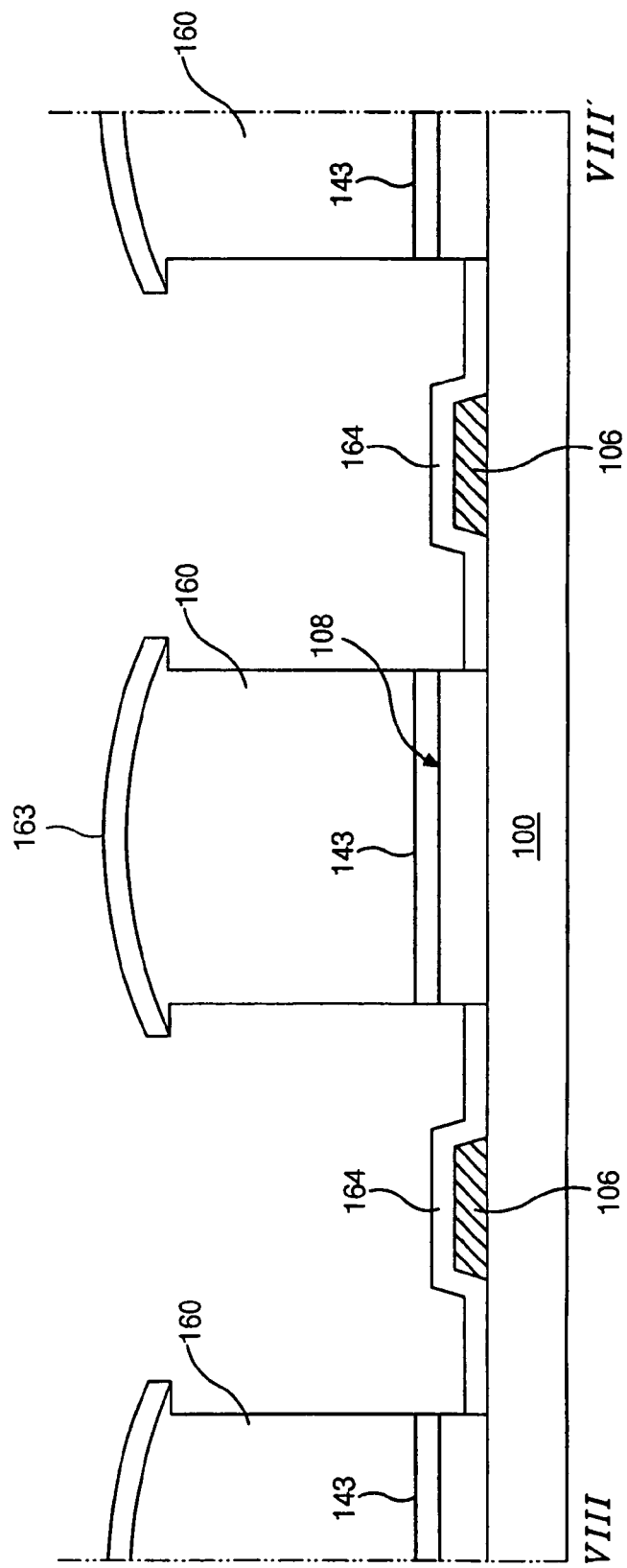
Figure 12:
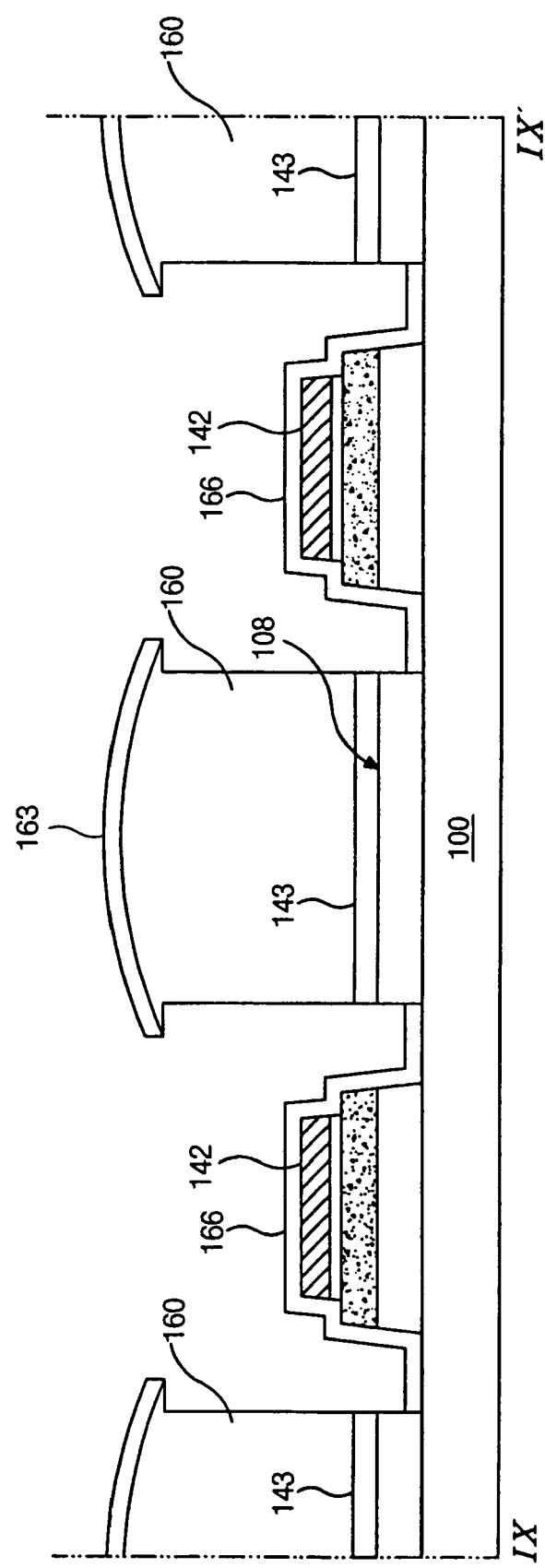

FIG. 10, FIG. 11 and FIG. 12 illustrate an array substrate according to another embodiment of the present invention and are cross-sectional views along the line VII-VII', the line VIII-VIII' and the line IX-IX' of FIG. 6, respectively.

As shown in the figures, an inorganic insulating pattern 143 is formed between the thin film transistor T and the organic passivation layer 160. The inorganic insulating pattern 143 is formed through a patterning process using the organic passivation layer 160 as an etching mask.

More particularly, after the source and drain electrodes 136 and 138 of the thin film transistor T and the data line 132 are formed, an organic insulating layer is formed by depositing one selected from an inorganic insulating material group including silicon nitride (SiNx) and silicon oxide (SiO$_2$).

Next, the patterned organic passivation layer 160 is formed on the inorganic insulating layer by the method stated in the previous embodiment. The inorganic insulating layer and the gate insulating layer, which are exposed by the passivation layer 160, are removed by using the patterned organic passivation layer 160 as an etching mask, thereby forming the inorganic insulating pattern 143. Accordingly, the inorganic insulating pattern 143 has the same shape as the patterned organic passivation layer 160.

Subsequently, the pixel electrode 162, the gate pad terminal 164 and the data pad terminal 166 are formed on the substrate 100 including the passivation layer 160 by depositing a transparent conductive material such as indium-tin-oxide (ITO) and indium-zinc-oxide (IZO) on the entire surface of the substrate 100. The pixel electrode 162 is disposed in the pixel region and is directly connected to not only the drain electrode 138 but the metal pattern 134 without contact holes. The pixel electrode 162 contacts the substrate 100 in the pixel region. The gate pad terminal 164 and the data pad terminal 166 cover and are in contact with the gate pad 106 and the data pad 142, respectively.

In the embodiment including the inorganic insulating pattern 143 between the passivation layer 160 and the thin film transistor T, the data line 132 and the gate line 102, since the inorganic insulating pattern 143 has better contact characteristics with the active layer 126 of the thin film transistor T than the organic passivation layer 160, the thin film transistor T can be improved in its operating characteristics. In addition, the inorganic insulating pattern 143 prevents the organic passivation layer 160 from coming off the gate and data lines 102 and 132.

Here, due to the height of the organic passivation layer 160, electrical shorts may occur between adjacent pads when driver integrated circuits are attached to the pads of the array substrate. Therefore, it is beneficial to remove the organic passivation layer 160. The organic passivation layer 160 may be removed by a liftoff method, where the array substrate is dipped into a stripper for the organic passivation layer 160 and the organic passivation layer 160 is stripped, whereby the transparent conductive patterns 163 is also detached from the array substrate because of the stripped organic passivation layer.

Like this, the array substrate of the present invention is manufactured by using three masks. Therefore, the manufacturing method of the array substrate according to the present invention decreases the processes and the cost, and increases productivity.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:
   a gate line and a gate pad on a substrate;
   a data line and a data pad on the substrate, the data line crossing the gate line to define a pixel region;
   a thin film transistor at a crossing of the gate and data lines and including a gate electrode, an active layer, a source electrode and a drain electrode;
   a passivation layer provided on an entire surface of the substrate including the thin film transistor, wherein the passivation layer is etched to expose the substrate in the pixel region, a part of the drain electrode, the gate pad, and the data pad, and wherein the passivation layer has reversely tapered sides; and a pixel electrode, a gate pad terminal and a data pad terminal on the substrate including the passivation layer, the pixel electrode directly contacting the exposed part of the drain electrode, the gate pad terminal contacting the exposed gate pad, and the data pad terminal contacting the data pad.

2. The array substrate according to claim 1, wherein the passivation layer has a surface of a circular arc.

3. The array substrate according to claim 1, wherein the passivation layer is patterned, and the pixel electrode, the gate pad terminal and the data pad terminal are disposed between patterns of the passivation layer.

4. The array substrate according to claim 1, wherein the pixel electrode contacts the exposed substrate in the pixel region.

5. The array substrate according to claim 1, wherein an amorphous silicon layer and a doped amorphous silicon layer are layered under the data line and the data pad.

6. The array substrate according to claim 5, wherein edges of the amorphous silicon layer are exposed.

7. The array substrate according to claim 1, further comprising a metal pattern having an island shape over the gate line.

8. The array substrate according to claim 7, wherein the passivation layer further exposes a part of the metal pattern.

9. The array substrate according to claim 8, wherein the pixel electrode directly contacts the exposed part of the metal pattern, whereby the metal pattern forms a storage capacitor with the gate line.

10. The array substrate according to claim 1, further comprising a conductive pattern on the passivation layer, wherein the conductive pattern is made of the same material as the pixel electrode.

11. The array substrate according to claim 1, wherein the active layer has the same shape as the source and drain electrodes and also includes an additional portion between the source and drain electrodes.

12. The array substrate according to claim 1, further comprising an inorganic insulating pattern between the passivation layer and the thin film transistor, the gate line and the data line, wherein the inorganic insulating pattern has the same shape as the passivation layer.

* * * * *